United States Patent
Bressler et al.

(10) Patent No.: US 12,448,313 B2
(45) Date of Patent: Oct. 21, 2025

(54) VERSATILE GLASS FORMING CONVEYOR WITH 3-D VACUUM FORMING CAPABILITY

(71) Applicant: Corning Incorporated, Corning, NY (US)

(72) Inventors: Douglas Dale Bressler, Julian, PA (US); David Alan Deneka, Corning, NY (US); William Edward Lock, Horseheads, NY (US); Phillip Richard MacCormack, Rochester, NY (US); Thomas Matthew Sonner, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 375 days.

(21) Appl. No.: 17/916,454

(22) PCT Filed: Mar. 30, 2021

(86) PCT No.: PCT/US2021/024871
§ 371 (c)(1),
(2) Date: Sep. 30, 2022

(87) PCT Pub. No.: WO2021/202519
PCT Pub. Date: Oct. 7, 2021

(65) Prior Publication Data
US 2023/0174406 A1 Jun. 8, 2023

Related U.S. Application Data

(60) Provisional application No. 63/119,261, filed on Nov. 30, 2020, provisional application No. 63/003,037, filed on Mar. 31, 2020.

(51) Int. Cl.
*C03B 13/08* (2006.01)
*C03B 33/023* (2006.01)
*C03B 35/14* (2006.01)

(52) U.S. Cl.
CPC .......... *C03B 13/08* (2013.01); *C03B 33/0235* (2013.01); *C03B 35/142* (2013.01)

(58) Field of Classification Search
CPC ....... C03B 13/08; C03B 17/06; C03B 13/183; C03B 33/0235; C03B 33/033
See application file for complete search history.

(56) References Cited

U.S. PATENT DOCUMENTS

| | | | | |
|---|---|---|---|---|
| 560,759 | A * | 5/1896 | Smith | ...................... C03B 13/12 65/44 |
| 1,297,566 | A * | 3/1919 | Johanson | ................ C03B 13/08 65/356 |

(Continued)

FOREIGN PATENT DOCUMENTS

| | | | | |
|---|---|---|---|---|
| CN | 105417934 A | * | 3/2016 | ............ B28B 11/16 |
| EP | 1464469 A2 | | 10/2004 | |

(Continued)

OTHER PUBLICATIONS

Extended European Search Report, EP application No. 21781805.3, dated Mar. 28, 2024, 7 pages, European Patent Office.

(Continued)

*Primary Examiner* — Erin Snelting
*Assistant Examiner* — Steven S Lee
(74) *Attorney, Agent, or Firm* — Svetlana Z. Short

(57) ABSTRACT

Various aspects of methods and systems are provided, which detail: a method, comprising: depositing a hot, flexible glass-containing ribbon along a plurality of sequentially conveyed molds; rolling a pinch roller over the surface of the glass-containing ribbon, such that at least one pinch region is actuated in the glass ribbon as the glass ribbon is pinched between a pinch edge of the pinch roller and the surface of the mold; and cooling the glass ribbon, separating the glass ribbon along the pinch region into discrete glass parts.

6 Claims, 22 Drawing Sheets

(56) References Cited

U.S. PATENT DOCUMENTS

| | | | |
|---|---|---|---|
| 1,310,451 A | | 7/1919 | Shields |
| 1,766,680 A | * | 6/1930 | Parham .................. C03B 9/12 65/92 |
| 1,863,915 A | * | 6/1932 | Waugh, Jr. ............. C03B 9/12 65/184 |
| 2,262,988 A | | 11/1941 | Brown et al. |
| 3,124,444 A | | 3/1964 | Ritter, Jr. et al. |
| 3,193,367 A | | 7/1965 | Giffen |
| 3,582,454 A | * | 6/1971 | Giffen ..................... C03B 9/12 428/428 |
| 3,859,407 A | | 1/1975 | Blanding et al. |
| 3,875,766 A | | 4/1975 | French |
| 4,128,369 A | | 12/1978 | Kemerer et al. |
| 4,361,429 A | * | 11/1982 | Anderson ........... C03B 23/0302 65/184 |
| 4,605,429 A | | 8/1986 | Rajnik |
| 4,743,284 A | | 5/1988 | Mouly et al. |
| 5,460,638 A | * | 10/1995 | Lock ....................... C03B 9/12 65/81 |
| 5,663,110 A | * | 9/1997 | Cowper ................ C03C 4/0035 501/55 |
| 5,885,315 A | * | 3/1999 | Fredholm .............. C03B 13/08 65/102 |
| 6,372,327 B1 | | 4/2002 | Burnham et al. |
| 8,713,972 B2 | | 5/2014 | Lakota et al. |
| 9,003,835 B2 | | 4/2015 | Lock |
| 9,969,643 B2 | | 5/2018 | Darcangelo |
| 10,239,778 B2 | | 3/2019 | Demartino et al. |
| 2003/0173429 A1 | * | 9/2003 | Puffe ...................... B05C 5/025 239/550 |
| 2013/0133369 A1 | * | 5/2013 | Lock ..................... C03B 17/065 65/93 |
| 2015/0033796 A1 | | 2/2015 | Collins |
| 2016/0009585 A1 | | 1/2016 | Bookbinder et al. |

FOREIGN PATENT DOCUMENTS

| | | | | |
|---|---|---|---|---|
| FR | 2074775 A1 | * | 10/1971 | ............. C03B 13/08 |
| JP | 05-085756 A | | 4/1993 | |
| JP | H0585756 A | * | 4/1993 | |
| JP | 2013-188993 A | | 9/2013 | |
| WO | WO-2008068324 A1 | * | 6/2008 | ............. C03B 13/01 |
| WO | 2014/186307 A1 | | 11/2014 | |

OTHER PUBLICATIONS

International Search Report and Written Opinion of the International Searching Authority; PCT/US2021/024871 Mailed on Jul. 15, 2021, 11 pages; Korean Patent Office.

* cited by examiner

(optional upstream processing) optional molten delivery 60 & glass processing system 200

Molten material delivery 60 (glass, glass ceramic, or ceramic material)

Thin Ribbon Deposition system 200, including: -Forming rollers 212 and Sizing rollers 218

Air blower 240 to air turn glass position/orientation change conveyor system 100

Deposit ribbon material along a plurality of mold assemblies 110 conveyed via a conveyor belt 108

Actuate pinch roller 146 surface onto glass ribbon first surface to press & pinch onto mold surface 120 to define pinch region Cool while conveying, simultaneously separating at thin pinch line to form discrete parts 24

Exert positive pressure at end of conveyor belt 108 via part removal module 160, to lift for removal and/or facilitate separation at thin pinch

Figure 1A conveyor system 100

Deposit ribbon material along a plurality of mold assemblies 110 conveyed via a conveyor belt 108, each mold surface 120 having at least one pinch edge 116

Actuate pressure roller surface 144 onto glass ribbon first surface to press glass ribbon onto pinch edge 116 of mold surface 120 to define pinch region in the lower surface of the glass ribbon Cool while conveying along conveyor belt 108, simultaneously separating at pinch region(s) to form discrete parts 24

Exert positive pressure at end of conveyor via part removal module 160, to lift for removal and/or facilittate separation at pinch region(s)

Figure 1B conveyor system 100

Deposit a ribbon material along a plurality of mold assemblies 110 conveyed via a conveyor belt 108, wherein each mold body 112 is configured with 3D surface pattern Actuate pressure roller surface 144 onto first surface of ribbon material to press glass ribbon onto 3D surface pattern into glass ribbon surface (impart texture/pattern)

Cool ribbon material with plurality of pinch regions, while conveying towards exit via conveyor belt 108

Exert positive pressure at end of conveyor via positive pressure actuator 162 of part removal module, to lift for removal and/or facilitate separation of discrete parts 24 at thin pinch (regions)

Figure 2 conveyor system 100

Deposit ribbon material along a plurality of mold assmeblies 110 conveyed via a conveyor belt 108, wherein each mold body is configured with a smooth surface pattern
(e.g. no 3D part pattern or surface texture)

Actuate pressure roller 144 having 3D patterned surface onto ribbon material to press onto 3D surface pattern into first surface of ribbon material (impart texture/pattern)

Cool while conveying

Exert positive pressure at end of conveyor via part removal module 160, to lift and facilitate separation at thin pinch

Figure 3 conveyor system 100

Deposit a ribbon material along a plurality of mold assemblies 110 conveyed via conveyor belt 108, wherein each mold surface 112 is configured with a 3D surface pattern (e.g. mold pattern)

Actuate pressure roller 144 having a 3D patterned surface (e.g. roller pattern) onto glass ribbon to simultaneously press each 3D patterned surface to each corresponding side of the glass ribbon (impart texture/pattern on both sides) (i.e. the mold pattern onto the second surface and the roller pattern onto the first surface Cool while conveying Exert positive pressure at end of conveyor, to lift and facilitate separation at thin pinch

Figure 4 conveyor system 100

Deposit ribbon material along a plurality of mold assemblies 110 conveyed along a conveyor belt 108, wherein each mold body 112 is configured with a 3D part pattern, wherein the mold assembly 110 is configured with vacuum engaging portions 132 (through holes, carrier mold 114 configured to vacuum box 136 w/in conveyor and negative pressure source (vacuum))

Vacuum actuate mold assemblies 110 via vacuum box 136 pulling vacuum through vacuum engaging portions 132, thereby deforming ribbon material to mold surface 112 to impart 3D part pattern into formed ribbon material (before, after, or during vacuum) Actuate pressure roller surface onto glass to press onto mold (impart characteristic) and impart pinch region(s) in the formed glass material Cool while conveying Exert positive pressure at end of conveyor, to lift and facilitate separation at thin pinch

Figure 5

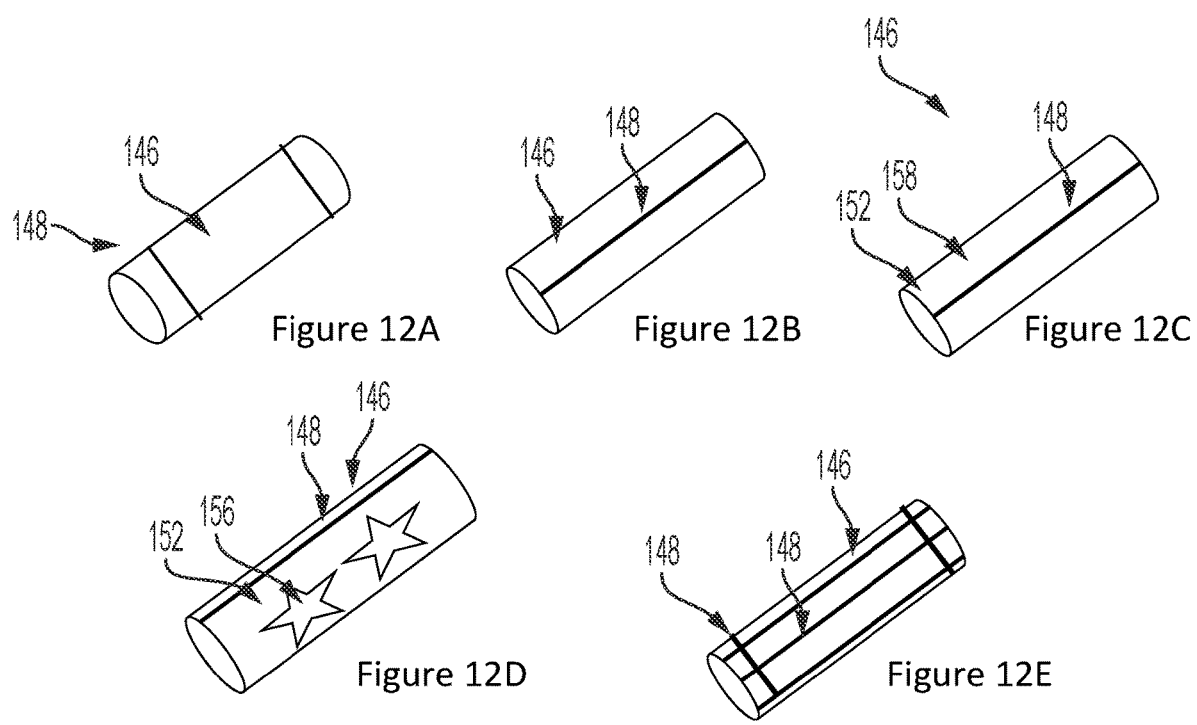

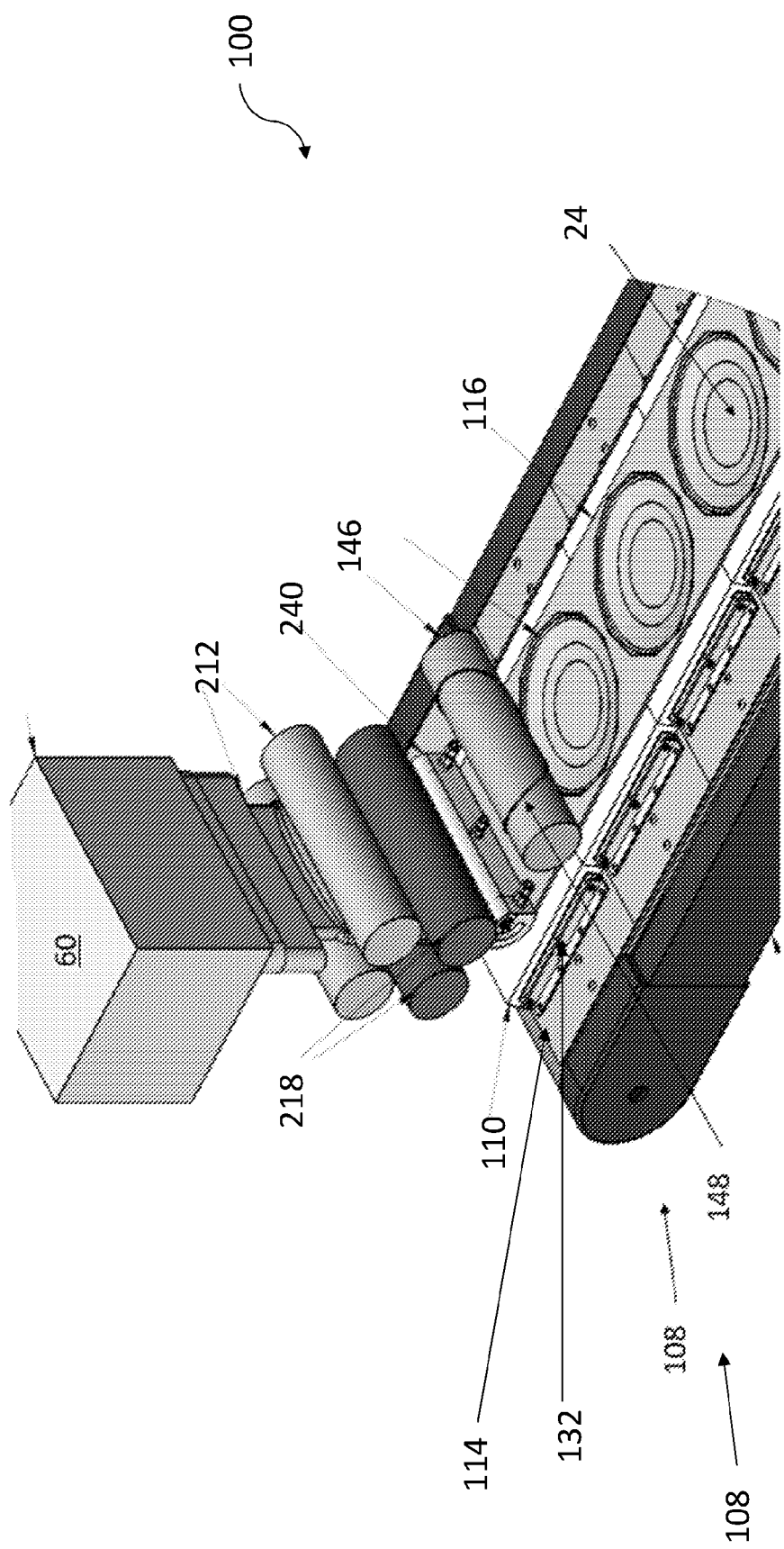

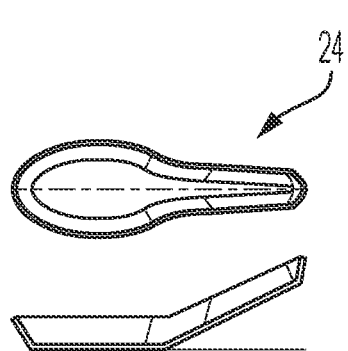
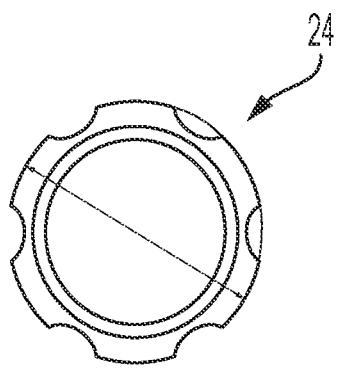
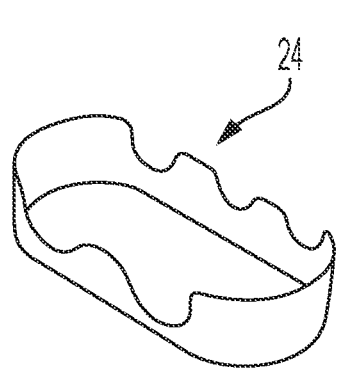
Figure 18A    Figure 18B    Figure 18E
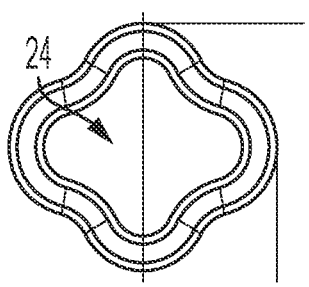
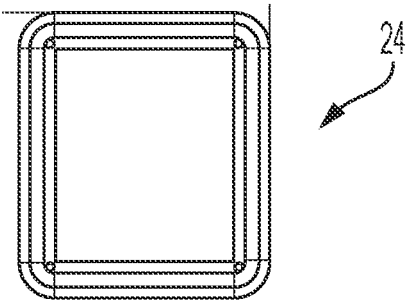
Figure 18C    Figure 18D

VERSATILE GLASS FORMING CONVEYOR WITH 3-D VACUUM FORMING CAPABILITY

CROSS REFERENCE TO RELATED APPLICATIONS

This application claims the benefit of priority under 35 U.S.C. § 371 of International Application No. PCT/US2021/024871 filed on Mar. 31, 2021, which claims the benefit of priority under 35 U.S.C. § 119 of U.S. Provisional Application No. 63/003,037, filed Mar. 31, 2020 and U.S. Provisional Application No. 63/119,261, filed Nov. 30, 2020, the content of each of which are incorporated herein by reference in its entirety.

BACKGROUND

Glass parts having unique shapes in high throughput manufacturing is highly desired. While there are some technologies in cutting and pressing individual parts, these methods can provide non-uniformities in the resulting parts and are not available in thinner cross-sectional part thicknesses.

FIELD OF THE INVENTION

Broadly, the present disclosure is directed towards systems and methods of making glass, glass ceramic, or ceramic parts having a thin (e.g. less than about 1 mm) cross-sectional wall thickness, unique shapes and/or surface patterning, with high volume throughput. More specifically, the present disclosure is directed towards various embodiments of a conveyor configuration and related methods of processing molten glass-containing materials (e.g. glass, glass ceramic, and/or ceramic materials with a unique configuration to provide advantaged, tailored, and/or uniquely shaped-parts (i.e. in near net shape and/or requiring minimal additional processing to result with the final part shape) at high volume manufacturing.

SUMMARY

Through one or more embodiments of the present disclosure, the systems are configured to make tailored (e.g. thin walled, uniformly cross-sectionally thick, complex surface patterned and/or shaped) glass, glass ceramic, and/or ceramic products that are not possible with any other forming technology. One or more products of the present system are configured with unique and/or tailored features, including but not limited to: complex 3D geometries, textured surfaces, discrete two-dimensional shapes, and/or combinations thereof.

In one embodiment, the ribbon is a monolithic glass, ceramic, or glass-ceramic sheet. In one embodiment, the ribbon is a laminate.

In one embodiment, product characteristics include, as non-limiting examples: product thickness (cross-sectional thickness) less than 1 mm thick; product wall thickness (cross-sectional thickness) 1 mm to 3 mm thickness; products having a small corner radii (e.g. 1.5 mm radii) between side and bottom (edges or walls of product form); three-dimensional shapes more than 1-inch deep w/ 1 mm wall thickness (Cross-sectional thickness); three dimensional products with thin walls (less than 1 mm thick) and steep sidewalls ranging from 3 degrees to 7 degrees. In some embodiments, the resulting products do not need to be annealed. In some embodiments, the products do not have chill-wrinkled surface feature and/or shear mark in parts made from pressing from a gob of molten material.

Some non-limiting examples of products include: textured roof tile, consumer electronics forms; perforated glass sheet (acoustic sheet); three dimensional shaped products, eating utensils, dinnerware forms; among other applications.

In one embodiment, a method is provided, comprising: delivering a molten glass, ceramic, or glass-ceramic -containing material into a glass forming and sizing assembly, the assembly comprising at least one pair of forming and sizing rollers; processing the molten glass via the at least one pair of forming and sizing rollers to form a glass ribbon having a width and a thickness; imparting, via a pair of pinching rollers, at least one pinch region into the cross-sectional thickness of the glass ribbon to provide a pinched glass ribbon, wherein the pinch region is defined as a localized area of reduced cross-sectional thickness; directing (via a conveyor or via air bend) the pinched glass ribbon onto plurality of sequentially spaced mold surfaces; rolling a pressure roller over the pinched glass ribbon on the sequentially spaced mold surfaces to impart a characteristic into the pinched glass ribbon to form a glass ribbon product; and cooling, thereby separating the glass ribbon product along the pinch region into a plurality of discrete glass parts, each glass part having the imparted characteristic.

In some embodiments, the method includes: wherein the pair of pinching rollers comprises a first roller and a second roller, where the first roller is configured with a pinch portion (edge or raised ridge).

In some embodiments, the method includes: wherein the pair of pinching rollers comprises a first roller and a second roller, where the first roller is configured with a pinch portion (edge or raised ridge) and the second portion is configured with a pinch portion (edge or raised ridge), wherein the first pinch portion of the first roller and the second pinch portion of the second roller are configured to matingly engage and actuate a pinch region in the glass ribbon.

In some embodiments, the method includes: wherein the imparting step further comprises imparting a surface texture on at least one of a first major surface of the glass ribbon and the second major surface of the glass ribbon (via a first pattern on a first roller surface and/or a second pattern on a second roller surface).

In some embodiments, the method further comprises: exerting pressurized air on the second surface of the glass ribbon product and/or discrete glass parts via a glass removal assembly, to facilitate part separation and/or spacing along the pinch region. In some embodiments, the method further comprises directing a puff of gas towards the second surface of the glass ribbon product and/or discrete glass parts via a glass removal assembly, to facilitate part separation and/or spacing along the pinch region. In some embodiments, the method further comprises directing a stream (e.g. continuous stream) of gas towards the second surface of the glass ribbon product and/or discrete glass parts via a glass removal assembly, to facilitate part separation and/or spacing along the pinch region.

In some embodiments, the pinch region defines part perimeter, possibly in combination with ribbon edges (if not also pinched).

In some embodiments, the pinch region comprises: transverse separation of each discrete glass component.

In some embodiments, the pinch region comprises: axial separation of each discrete glass component.

In some embodiments, the pinch region comprises: transverse separation and axial separation of each discrete glass component.

In some embodiments, the pinch region comprises: axial separation of glass component from discontinuous edge portion/cullet (forming high strength, clean edge). In some embodiments, by fire polishing the pinch region a high strength, a clean edge can be formed in the discrete glass products.

In some embodiments, the method is configured to provide a part with at least one of: 2D asymmetrical edge part formation; 2D geometric perimetrical edge part formation; 2D non-perfect/ non-concentric edge part formation; at least one characteristic (e.g. flatness, texture, pattern), and/or combinations thereof.

In some embodiments, each mold of the sequentially spaced molds is configured with a mold having a mold surface, a mold carrier box, and a removably attachable mechanical engagement to a conveyor belt.

In some embodiments, the conveyor is configured with a vacuum box which is in communication with a plurality of the molds and mold carrier boxes, such that the vacuum box, mold carrier, and mold are configured to draw a vacuum through the assembly.

In some embodiments, the method comprises: actuating a vacuum across a plurality of vacuum equipped molds to deform the pinched glass ribbon into the surface of each of the molds.

As a non-limiting example, a ribbon material means that the length is longer than the width. While the term ribbon is used herein, it's similarly understood that sheet can also be processed according to one or more embodiments of the present disclosure (i.e. where sheet has a larger cross-sectional area than ribbon, as a sheet would have similar length and cross-sectional thickness as the ribbon, but would be configured with a larger width than the ribbon).

As used herein, pinch means reducing the cross-sectional thickness of the ribbon material by a predetermined amount. As set forth herein, with a ribbon cross-sectional thickness of 1 mm (e.g. average cross-sectional thickness), a pinch region having an average thickness selected between the range of at least 0.25 mm to not greater than 0.51 mm. As a non-limiting example, a pinch region has a reduced cross-sectional thickness of at least 25% of the cross-sectional thickness of the ribbon material to not greater than 75% of the cross-sectional thickness of the ribbon material. As a non-limiting example, a pinch region has a reduced cross-sectional thickness of at least 30% of the cross-sectional thickness of the ribbon material to not greater than 70% of the cross-sectional thickness of the ribbon material. As a non-limiting example, a pinch region has a reduced cross-sectional thickness of at least 40% of the cross-sectional thickness of the ribbon material to not greater than 75% of the cross-sectional thickness of the ribbon material.

As used herein, uniform means generally having a consistent cross-sectional thickness, where the cross-sectional thickness is within a predetermined range/variation. For example, for a cross-sectional thickness of 1 mm, a uniform cross-sectional thickness may be within about 10% of 1 mm, within about 5% of 1 mm, within about 3% of 1 mm, within about 1% of 1 mm; within about 0.5% of 1 mm.

In one embodiment, a method is provided, comprising: depositing a hot, flexible glass-containing ribbon (e.g. taffy-like consistency) along a plurality of sequentially conveyed molds, wherein the glass ribbon comprises a thickness of not greater than 1 mm, further wherein the glass ribbon comprises a uniform thickness; rolling a pinch roller over the surface of the glass-containing ribbon, such that at least one pinch region is actuated in the glass ribbon as the glass ribbon is pinched between a pinch edge of the pinch roller and the surface of the mold; and cooling the glass ribbon, [e.g. whereby the compressive stresses between the pinch region and the adjacent pinch regions is configured to thereby] separating the glass ribbon along the pinch region into discrete glass parts.

In some embodiments, the perimetrical edge of the discrete glass part is defined by the pinch region, optionally in combination with the at least one of the edge of the glass ribbon.

In one embodiment, a method is provided, comprising: depositing a hot, flexible glass-containing ribbon along a plurality of sequentially conveyed molds, wherein the glass ribbon comprises a thickness of not greater than 1 mm, further wherein the glass ribbon comprises a uniform thickness, further wherein each mold is configured with a three-dimensional surface pattern; rolling a pressure roller over the surface of the glass-containing ribbon, such that at least one pressure roller is actuated in the glass ribbon as the glass ribbon is pressed between the three-dimensional surface of the mold and the pressure roller; and cooling the glass ribbon, to define a three dimensional patterned surfaced glass ribbon.

In one embodiment, the method comprises: cutting the glass ribbon into discrete parts (via laser processing, score edge break, machining, selective ablation, chemical ablation, and/or combinations thereof).

In one embodiment, the method comprises, utilizing a pinch roller during processing to define a pinch region in the ribbon material.

In one embodiment, a method is provided, comprising: depositing a hot, flexible glass-containing ribbon along a plurality of sequentially conveyed molds, wherein the glass ribbon comprises a thickness of not greater than 1 mm, further wherein the glass ribbon comprises a uniform thickness; rolling a pressure roller over the surface of the glass-containing ribbon, wherein the pressure roller has a surface defined with a three-dimensional pattern, such that at least one pressure roller is actuated in the glass ribbon as the glass ribbon is pressed between the three-dimensional surface of the mold and the three-dimensional surface pattern of the pressure roller; and cooling the glass ribbon, to define a three-dimensional patterned surfaced glass ribbon.

In one embodiment, a method is provided, comprising: depositing a hot, flexible glass-containing ribbon along a plurality of sequentially conveyed molds, wherein the glass ribbon comprises a thickness of not greater than 1 mm, further wherein the glass ribbon comprises a uniform thickness; further wherein each mold is configured with a first three-dimensional surface pattern; rolling a pressure roller over the surface of the glass-containing ribbon, wherein the pressure roller has a surface defined with a second three-dimensional pattern, such that at least one pressure roller is actuated in the glass ribbon as the glass ribbon is pressed between the first three-dimensional surface of the mold is imparted on the first glass ribbon surface and the second three-dimensional surface pattern of the pressure roller is imparted into the second glass ribbon surface; and cooling the glass ribbon, to define a three-dimensional surface patterned glass part having a cross-sectional wall thickness of not greater than 1 mm.

In one embodiment, a method is provided, comprising: depositing a hot, flexible (e.g. taffy-like consistency) glass-containing ribbon along a plurality of sequentially conveyed molds, wherein the glass ribbon comprises a thickness of not greater than 1 mm, further wherein the glass ribbon comprises a uniform thickness; further wherein each mold is configured with a three-dimensional part shape in its surface, with vacuum engaging portions; negatively pressurizing the cavity defined between the glass ribbon and the mold surface via the vacuum engaging portions, thereby forming the glass ribbon to the surface of the three-dimensional part shape; rolling a pressure roller over the surface of the glass-containing ribbon, such that the pressure roller is configured to engage the glass ribbon towards the mold (e.g. outer edges of the ribbon towards the outer edges of the mold) to enable vacuum forming of the glass ribbon to the mold surface pattern; and cooling the glass ribbon, to define a three-dimensional glass part having a cross-sectional wall thickness of not greater than 1 mm.

In some embodiments, the perimetrical edge of the discrete glass part is defined by the pinch region, optionally in combination with the at least one of the edge of the glass ribbon.

In some embodiments, molten glass delivery can be completed via crucible, via a round tube delivery (e.g. of continuous tank batch tank); or from a fishtail spreading orifice or slot delivery. In some embodiments, the slot delivery can be configured to supply a stream of monolithic sheet glass or a laminated sheet of glass to promote uniform edge-to-edge puddle in the top set of the sheet forming rollers.

In some embodiments, the crucible is configured to deliver 3-5 pounds of molten glass (e.g. using a dam as an option to control the sheet width). In this embodiment, a plurality of mold cavities can be covered (e.g. 10-30) depending on the desired size and thickness of the resulting product forms. In some embodiments, the round tube delivery is configured to deliver glass at a desired viscosity (e.g. not less than 500 poise and not greater than 3000 poise), configured to the top set of rollers, with or without dams. The glass delivered from the tube forms a puddle of glass that flows outward from the exit at the tube exit at the center. The puddle width can be established to be a desired width by selecting the appropriate glass delivery flow rate (e.g. pounds per hour) plus the appropriate roller gap (millimeters and process speed (e.g. inches per second).

In some embodiments, a control system is utilized to configure/control/adjust one or more aspects of the systems and components, including: flow controls, pressure of air flowing through (positive or negative/vacuum), flow controls/roller coolant, coolant flow rate, air flow rate (for air bend/air turn), collet, synchronization of rollers with conveyor speed and/or pressure down roller speed, and combinations thereof, among other items.

In some embodiments, the ribbon deposition system is configured to create hot flexible flat sheet (e.g. taffy-like) from the molten material and deliver it to the conveyor. The ribbon deposition/ribbon processing system includes: at least one pair of rollers, two pairs of rollers, 3 pairs of rollers, or more. In some embodiments, the roller types used in the rolling machine delivery system include: smooth surface stainless steel rollers (with or without contour); ceramic coated rollers (e.g. configured to exhibit low thermal conductivity); textured rollers; sculptured rollers (e.g. with pronounced 3D relief); thin pinch rollers (e.g. configured with protruding pinch edges for sheet separation and/or discrete part perimeter shaping); rollers with 3D pockets; rollers with special configurations (e.g. pin rollers to perforate the surface of the sheet); metallic rollers (e.g. Inconel, nickel-specialty alloy, high-temp composition rollers); ceramic coated materials (e.g. dense chrome oxide, polished to a mirror surface finish). Some non-limiting examples of ceramic-coated rollers include zirconia, chromia alumina (e.g. plasma-sprayed chromia alumina) and layered applications of each of the compositions).

In some embodiments, the pressure/push-down roller on the conveyor is configured to be driven by a motor (e.g. servo motor). The pressure/push-down roller can be configured as a smooth surface roller, a textured surface roller, a pinch roller, a pinch roller with textured surface, and combinations thereof.

In some embodiments, the conveyor includes: a roller chain, which can modify the length of the conveyor by adding additional chain lengths and/or changing the length of the sides of the conveyor. In some embodiments, the conveyor width can be modified by at least one of: changing the length of the spacers separating the two sides of the conveyors, changing the length of the sprocket shafts, and changing the widths of the mold, mold carriers, and/or pressure roller subassembly.

In some embodiments, the conveyor includes a mold carrier/mold chain configured to retain a plurality of molds along the length of the conveyor (e.g. sequentially, in series).

In some embodiments, the mold can be configured as: a flat top surface, a flat mold with textured three-dimensional top surface, vacuum-forming molds with 3D shapes (e.g. male shapes above the plane or female cavities below the plane, employ complex shapes); three dimensional shape with a sculptured/textured surface(s); three dimensional cavity with a pinch edge configured along the perimeter of the cavity, a mold with a pinch edge along one end of each mold carrier, and/or combinations thereof.

In one embodiment, molds can be cast ceramic molds (e.g. configured with very low thermal conductivity). In one embodiment, the mold is configured to be used at room temperature even with hot glass. In one embodiment, the mold is configured with cooling/cooled air or fluid.

Non-limiting examples of mold materials include: castable ceramic, room temperature curing silica ceramic (e.g. Cotronics Corporation, Rescor 750)), stainless steel, cast-iron, incramet 800 with a chromium oxide coating, among others.

In some embodiments, the pinch region is configured such that the ribbon material self-separates as it travels down the conveyor (and correspondingly continues to cool). For example, as the processed glass ribbon (or ceramic ribbon, or glass ceramic ribbon) continues to cool as it travels down the conveyor, the temperature difference between the thick glass of the product and the thin glass at the thin pinch location causes a thermal stress along the pinch region, which resultingly self-separates ribbon material along the pinch region such that the ribbon material is formed into discrete parts or components by the time it reaches the end of the conveyor.

Using one or more of the embodiments described herein, three dimensional forming of complex shaped products has been demonstrated at process speeds as high as 30 in/sec. For a five inch long product (e.g. handheld phone back), this processing speed equates to more than five pieces manufactured per second. Five pieces per second equals 300 pieces per minute equals 18,000 pieces per hour equals 432,000 pieces in a 24 hour day equals 157,680,000 pieces per 365 day year. At a conservative 64 percent select rate, this means that one machine system could create more than 100 million qualifying parts per year.

In some embodiments, low viscosity glass (50-100 poise at delivery) is formed into ribbon material.

In some embodiments, vacuum forming of hot glass sheet (at a viscosity range of 100 to 10,000 poise) causes complete pull down of the hot sheet into the vacuum mold cavities and accurately duplicates the surface features of the mold (e.g. fine features).

Additional features and advantages will be set forth in the detailed description which follows and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

FIG. 1A is a schematic of an embodiment of a glass processing conveyor, in accordance with one or more aspects of the present disclosure.

FIG. 1B is a schematic of an embodiment of a glass processing conveyor, in accordance with one or more aspects of the present disclosure.

FIG. 2 is a schematic of an embodiment of a glass processing conveyor, in accordance with one or more aspects of the present disclosure.

FIG. 3 is a schematic of an embodiment of a glass processing conveyor, in accordance with one or more aspects of the present disclosure.

FIG. 4 is a schematic of an embodiment of a glass processing conveyor, in accordance with one or more aspects of the present disclosure.

FIG. 5 is a schematic of an embodiment of a glass processing conveyor, in accordance with one or more aspects of the present disclosure.

Figure 8A:
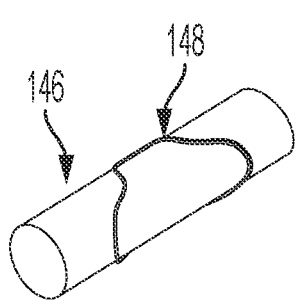
FIG. 8A-8C depicts three different embodiments for a pinch roller having a pinch edge, in accordance with one or more aspects of the present disclosure.
Figure 8B:
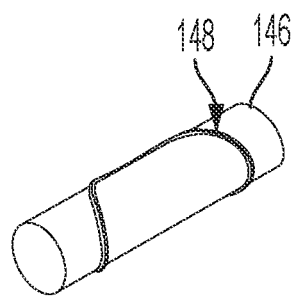
Figure 8C:
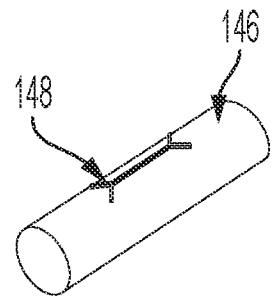

In some embodiments, one of the pinch rollers of FIGS. 8A through 8C are configured in the pinch rollers of the glass processing assembly.

In some embodiments, one of the pinch roller of FIGS. 8A through 8C are configured in the pressure roller of the conveyor system.

Referring to FIG. 8A, a pinch roller having a pinch edge configured as a complex-patterned perimeter (e.g. non-circular, atypical, and/or asymmetrical) is depicted, in accordance with one or more embodiments of the present disclosure.

Referring to FIG. 8B, a pinch roller having a pinch edge configured as a circular perimeter is depicted, in accordance with one or more embodiments of the present disclosure.

Referring to FIG. 8C, a pinch roller having a pinch edge configured as a double-Y is depicted, in accordance with one or more aspects of the present disclosure. As a non-limiting example, when utilized on the ribbon material, the double Y is configured to define a border between two discrete parts, while providing a collared-edge (e.g. corner cuts) along the corners of the part.

Figure 9A:
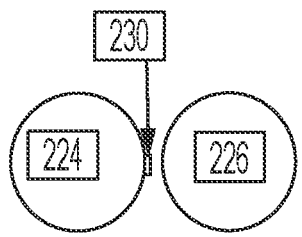

FIG. 9A depicts a schematic view of the pinch rollers of the glass processing system, in accordance with one or more embodiments of the present disclosure.

As depicted in FIG. 9A, one of the two rollers is configured with a pinch edge, such that when the ribbon material travels between the pinch rollers, a pinch region is defined in the ribbon material.

Figure 9B:
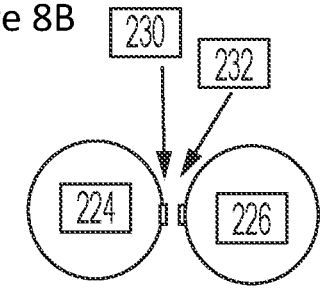

FIG. 9B depicts a schematic view of the pinch rollers of the glass processing system, in accordance with one or more embodiments of the present disclosure.

As depicted in FIG. 9B, each of the rollers is configured with a pinch edge (such that the pinch edges correspond to each other's respective positions), such that when the ribbon material travels between the pinch rollers, a pinch region is defined in the ribbon material as the two pinch edges matingly engage in a corresponding proximal position.

Figure 10A:
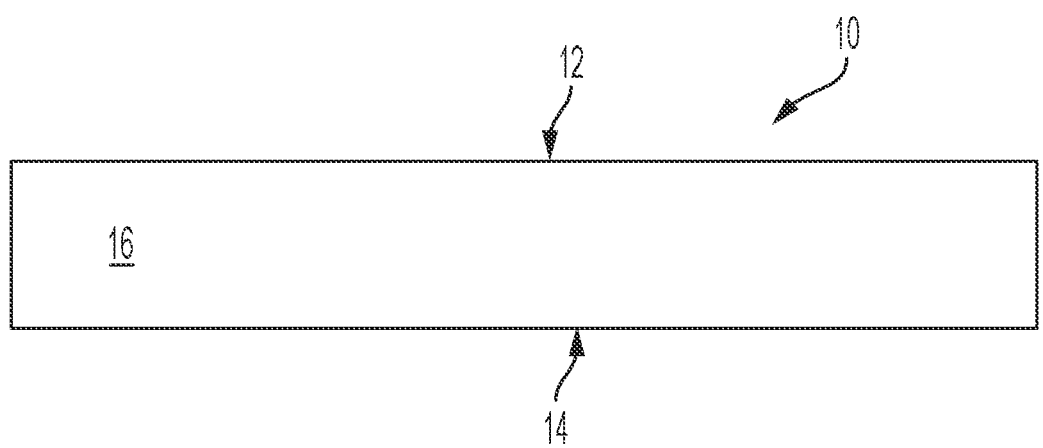

FIG. 10A is a schematic plan top view of an embodiment of a ribbon material, in accordance with various aspects of the present disclosure.

Figure 10B:
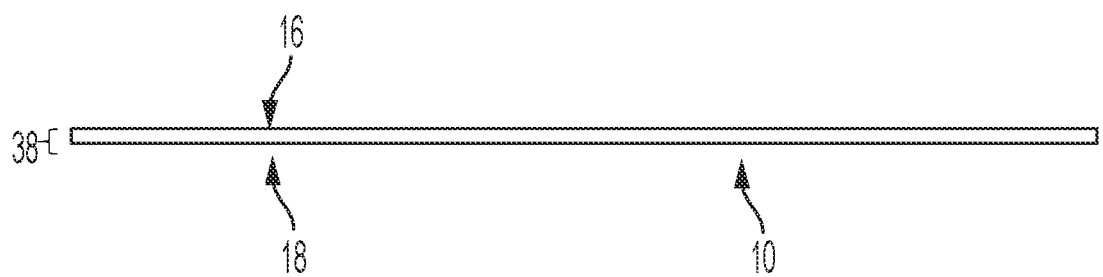

FIG. 10B is a schematic side plan view of the ribbon material, in accordance with one or more aspects of the present disclosure.

Figure 11A:
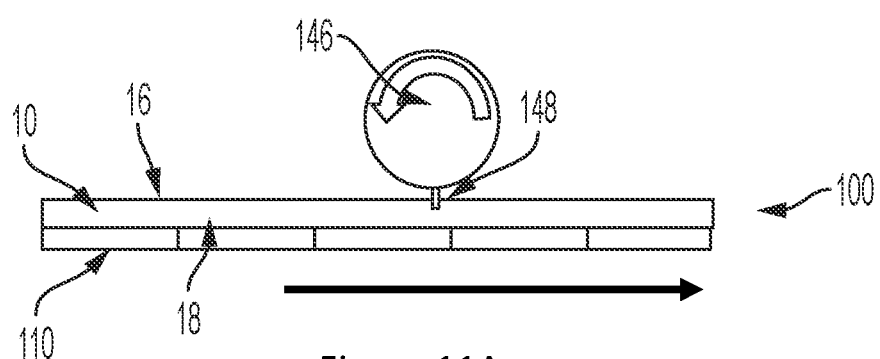

FIG. 11A is a schematic plan side view of an embodiment of a ribbon material positioned in the conveyor system, in accordance with various aspects of the present disclosure.

Figure 11B:
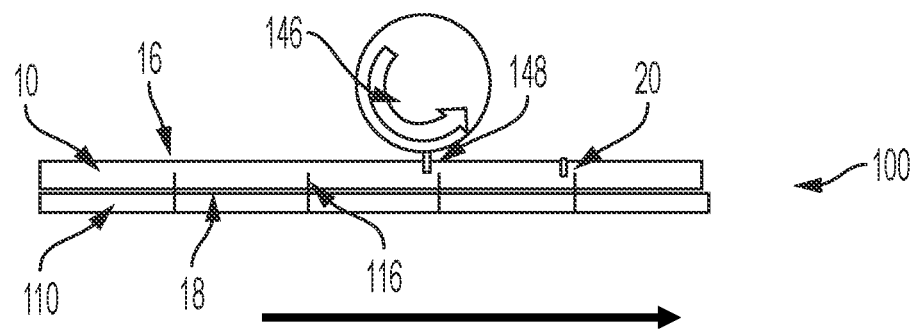

FIG. 11B is a schematic plan side view of an embodiment of a ribbon material positioned in the conveyor system where the mold assemblies are each configured with a corresponding pinch edge, in accordance with various aspects of the present disclosure.

FIG. 12A-12E depict various configurations of a roller, utilizable in the pinch roller of the glass processing system and/or in the pressure roller of the conveyor system, in accordance with one or more aspects of the present disclosure.

FIG. 12A depicts a schematic view of a pinch roller, utilizable in the pinch roller of the glass processing system and/or in the pressure roller of the conveyor system, in accordance with one or more aspects of the present disclosure.

FIG. 12B depicts a schematic view of a pinch roller, utilizable in the pinch roller of the glass processing system and/or in the pressure roller of the conveyor system, in accordance with one or more aspects of the present disclosure.

FIG. 12C depicts a schematic view of a pinch roller, utilizable in the pinch roller of the glass processing system and/or in the pressure roller of the conveyor system, in accordance with one or more aspects of the present disclosure.

FIG. 12D depicts a schematic view of a pinch roller, utilizable in the pinch roller of the glass processing system and/or in the pressure roller of the conveyor system, in accordance with one or more aspects of the present disclosure.

FIG. 12E depicts a schematic view of a pinch roller, utilizable in the pinch roller of the glass processing system and/or in the pressure roller of the conveyor system, in accordance with one or more aspects of the present disclosure.

Figure 13:
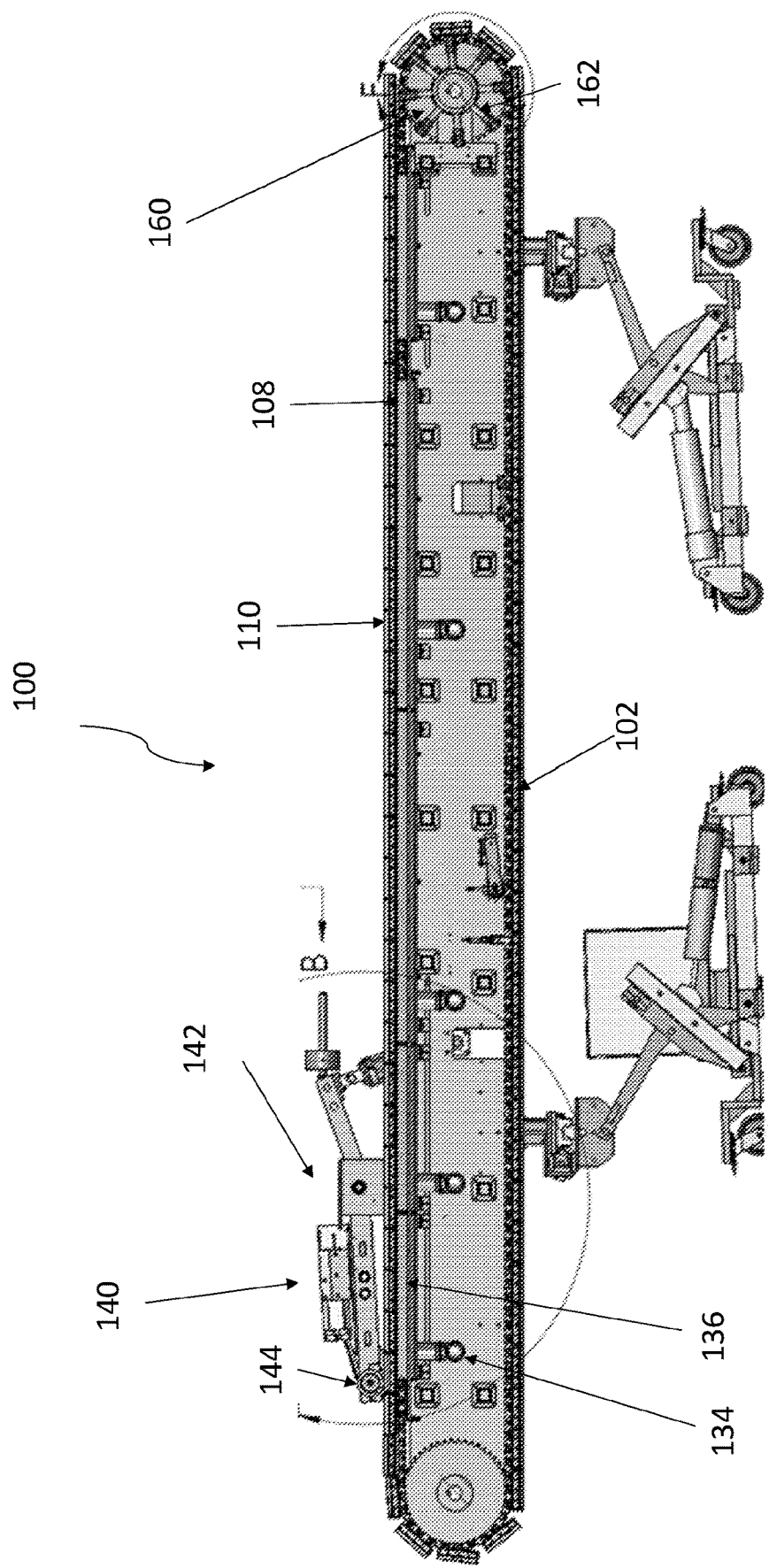

FIG. 13 depicts a schematic cut-away side view of the conveyor assembly, which shows the vacuum ports, vacuum boxes configured below the mold assemblies, and push-up members configured at the end of the conveyor, in accordance with one or more embodiments of the present disclosure.

Figure 14:
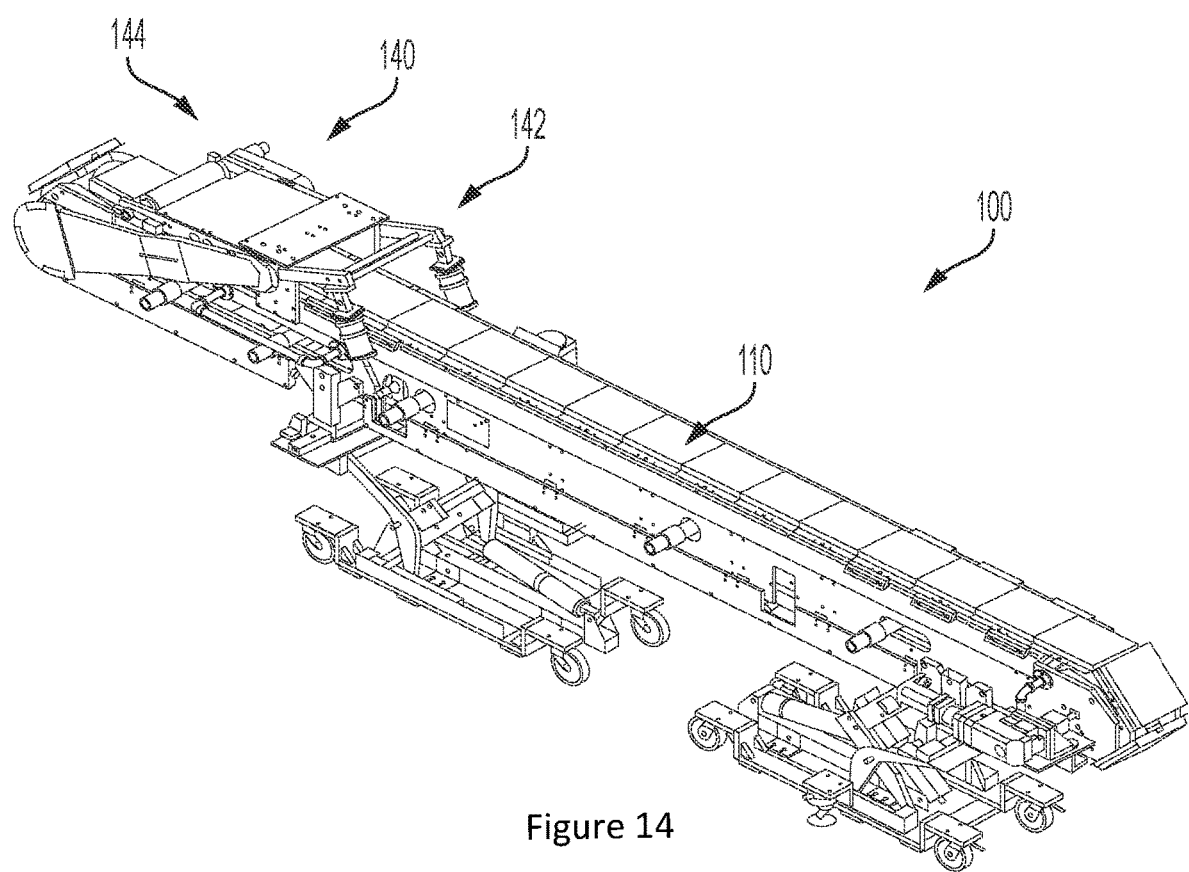

FIG. 14 is a perspective top view of an embodiment of a conveyor assembly having a plurality of mold assemblies with flat surfaces, in accordance with one or more aspects of the present disclosure.

Figure 15:
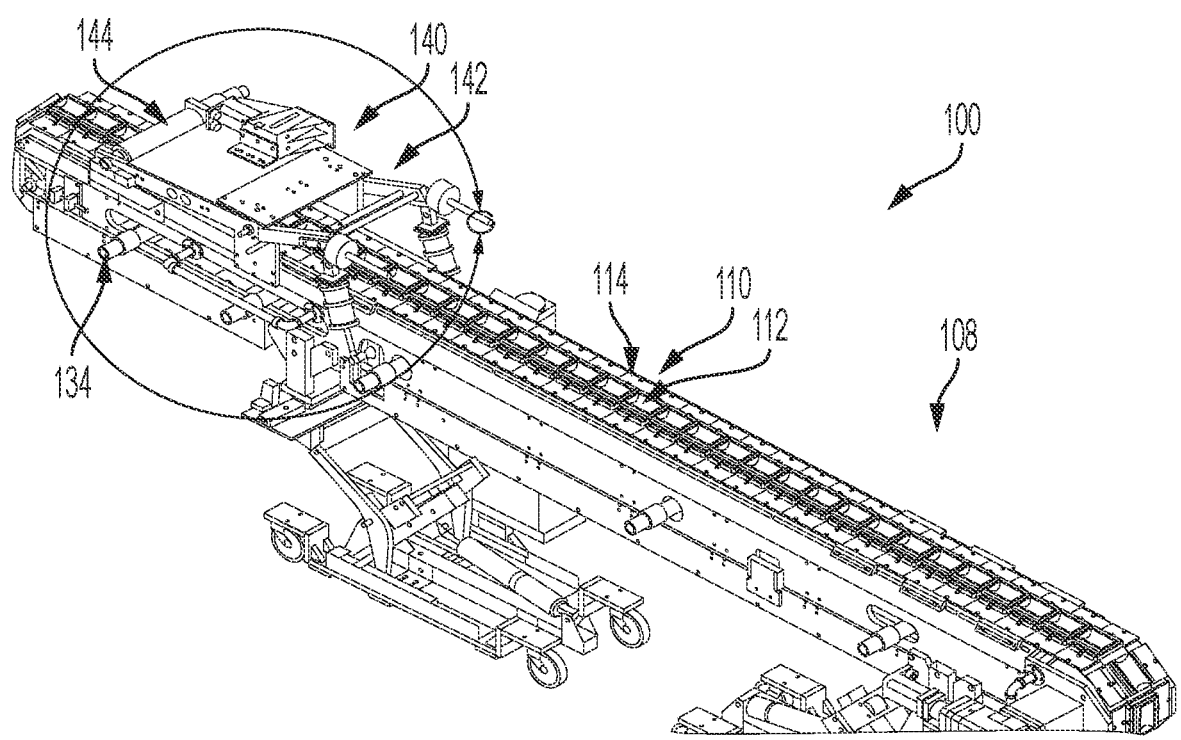

FIG. 15 is a perspective top view of an embodiment of a conveyor assembly having a plurality of mold assemblies with three-dimensional complex shapes and corresponding vacuum forming configuration, in accordance with one or more aspects of the present disclosure.

Figure 16A:
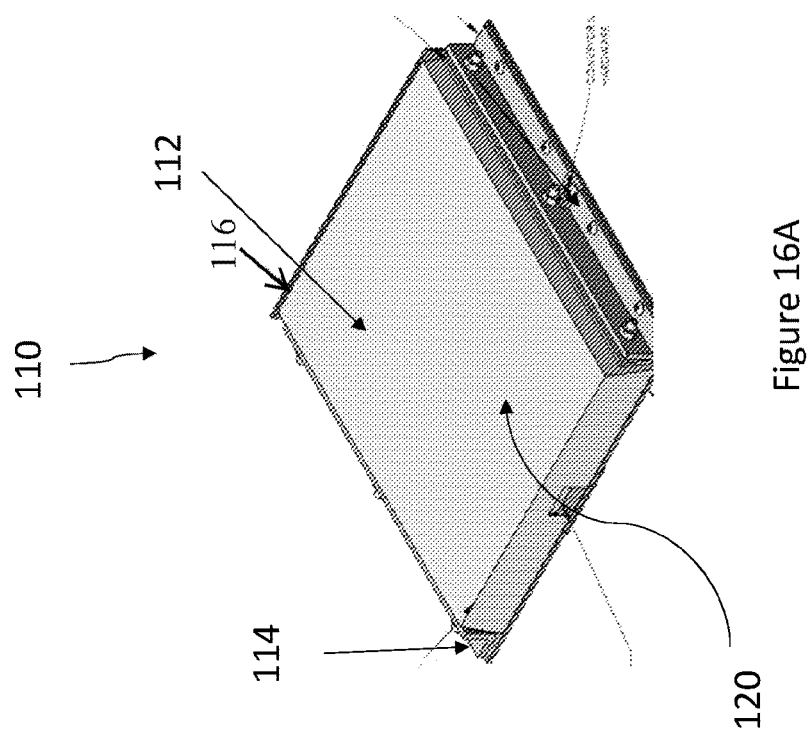

FIG. 16A is a close-up perspective top view of the mold assembly utilized in the conveyor system of FIG. 14, depicting a flat surfaced-mold, in accordance with one or more embodiments of the present disclosure.

Figure 16B:
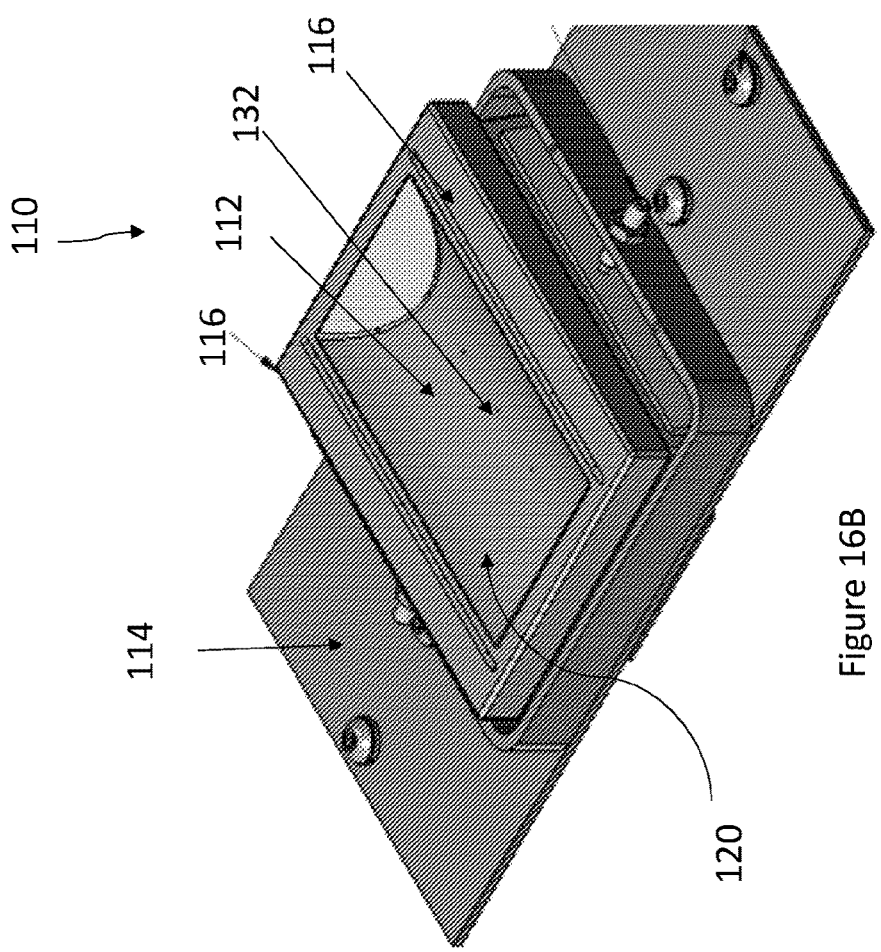

FIG. 16B is a close-up perspective top view of the mold assembly utilized in the conveyor system of FIG. 15, depicting a three-dimensional shaped surfaced-mold, in accordance with one or more embodiments of the present disclosure.

Figure 16C:
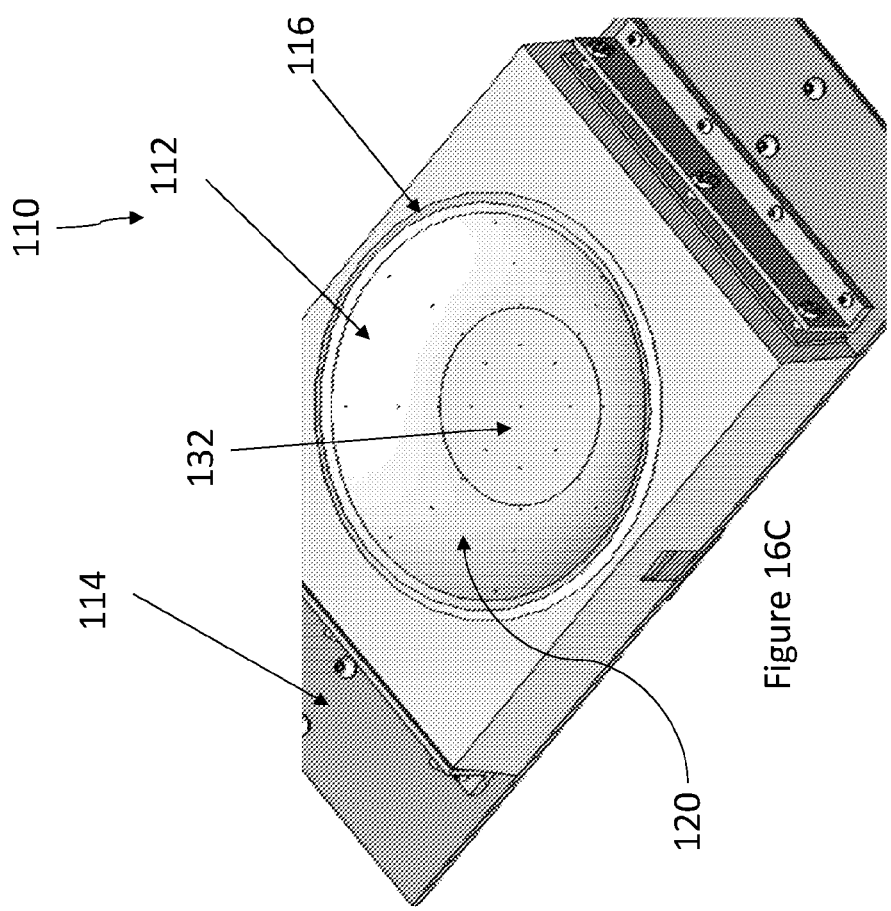

FIG. 16C is a close-up perspective top view of the mold assembly utilized in the conveyor system of FIG. 18, depicting a three-dimensional shaped surfaced-mold, in accordance with one or more embodiments of the present disclosure.

FIG. 17 is a perspective top view of an embodiment of a conveyor assembly having a plurality of mold assemblies with three-dimensional complex shapes and corresponding vacuum forming configuration, in combination with a pinch edge in the mold assembly (e.g. to define a pinch region around the three-dimensional part formed via vacuum), in accordance with one or more aspects of the present disclosure. In some embodiments, the pinch edge on roller is configured to be synchronizable with the mold perimeter trim edge (such that the two components cooperate in timing of actuation to, together, to form the pinch in the glass ribbon).

FIG. 18A-E depict various embodiments of complex three-dimensional parts that are manufacturable from ribbon material with one or more aspects of the present disclosure.

FIG. 18A depicts a plan top view (upper FIG. 18A) and plan side view (lower FIG. 18A), depicting an embodiment of a product formed from a vacuum mold assembly having a three-dimensional shape therein, in combination with the conveyor system, in accordance with one or more aspects of the present disclosure. FIG. 18A depicts a product configured as an eating utensil (e.g. soup spoon).

FIG. 18B depicts a plan top view of an embodiment of a product formed from a vacuum mold assembly having a three-dimensional shape therein, in combination with the conveyor system, in accordance with one or more aspects of the present disclosure. FIG. 18B depicts a product configured as round plate with non-uniform edge (e.g. scalloped edge).

FIG. 18C depicts a plan top view of an embodiment of a product formed from a vacuum mold assembly having a three-dimensional shape therein, in combination with the conveyor system, in accordance with one or more aspects of the present disclosure. FIG. 18C depicts a product configured as symmetrical, non-round plate with non-uniform edge (e.g. corresponding perimetrical edge).

FIG. 18D depicts a plan top view of an embodiment of a product formed from a vacuum mold assembly having a three-dimensional shape therein, in combination with the conveyor system, in accordance with one or more aspects of the present disclosure. FIG. 18D depicts a product configured as symmetrical, geometric (rectangular) plate with non-uniform edge (e.g. corresponding perimetrical edge).

FIG. 18E depicts a perspective top view of an embodiment of a product formed from a vacuum mold assembly having a three-dimensional shape therein, in combination with the conveyor system, in accordance with one or more aspects of the present disclosure. FIG. 18E depicts a product configured as symmetrical, geometric (oval) with a raised edge/wall having a non-uniform height (scalloped or ridged wall).

Figure 19:
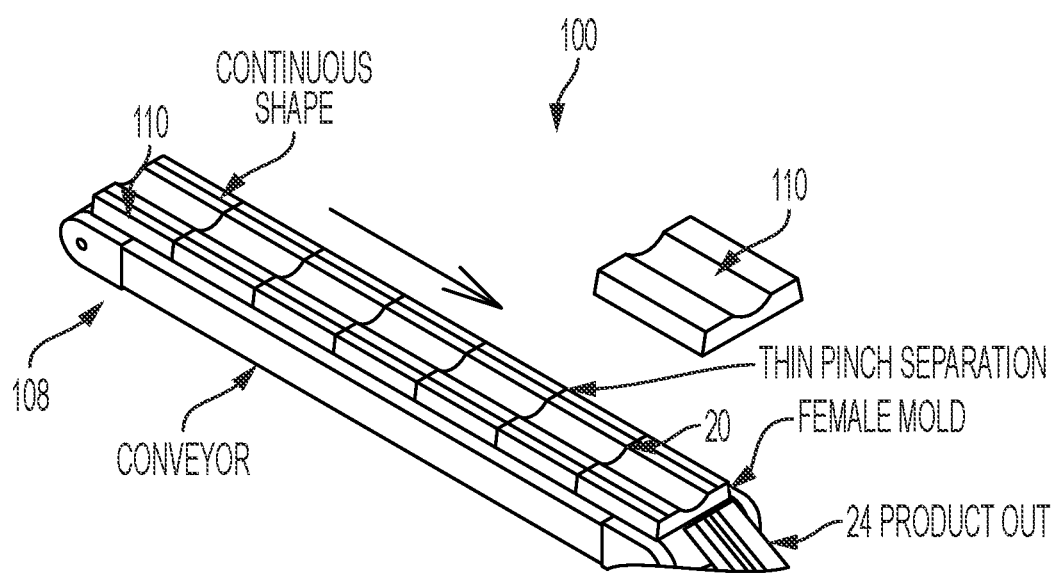

FIG. 19 depicts a schematic, perspective top view of an embodiment of the conveyor system in accordance with one or more aspects of the present disclosure.

Figure 20:
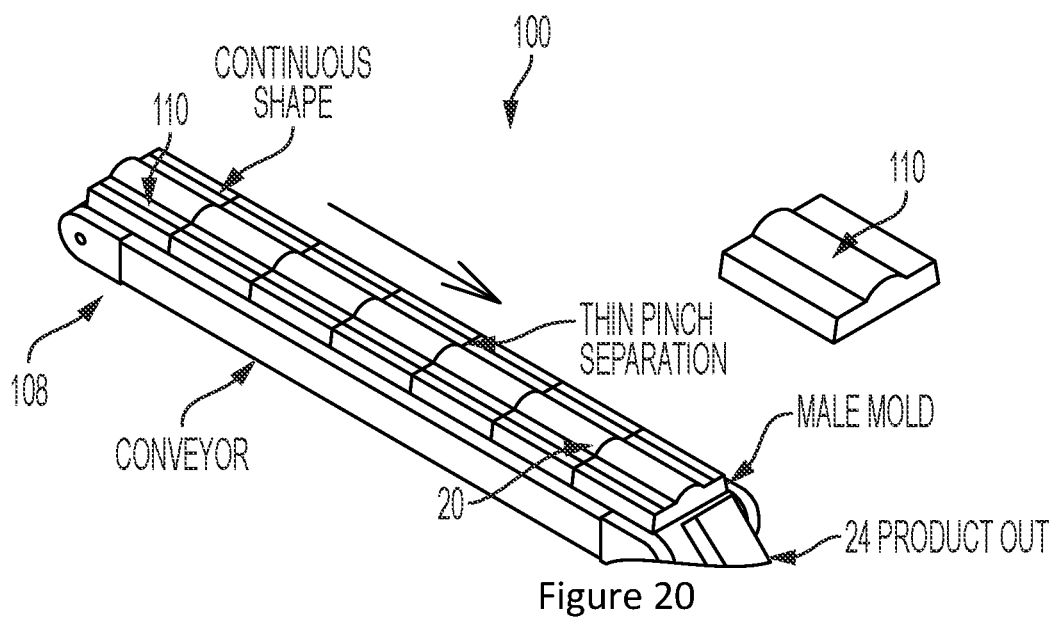

FIG. 20 depicts a schematic, perspective top view of an embodiment of the conveyor system in accordance with one or more aspects of the present disclosure.

Figure 21:
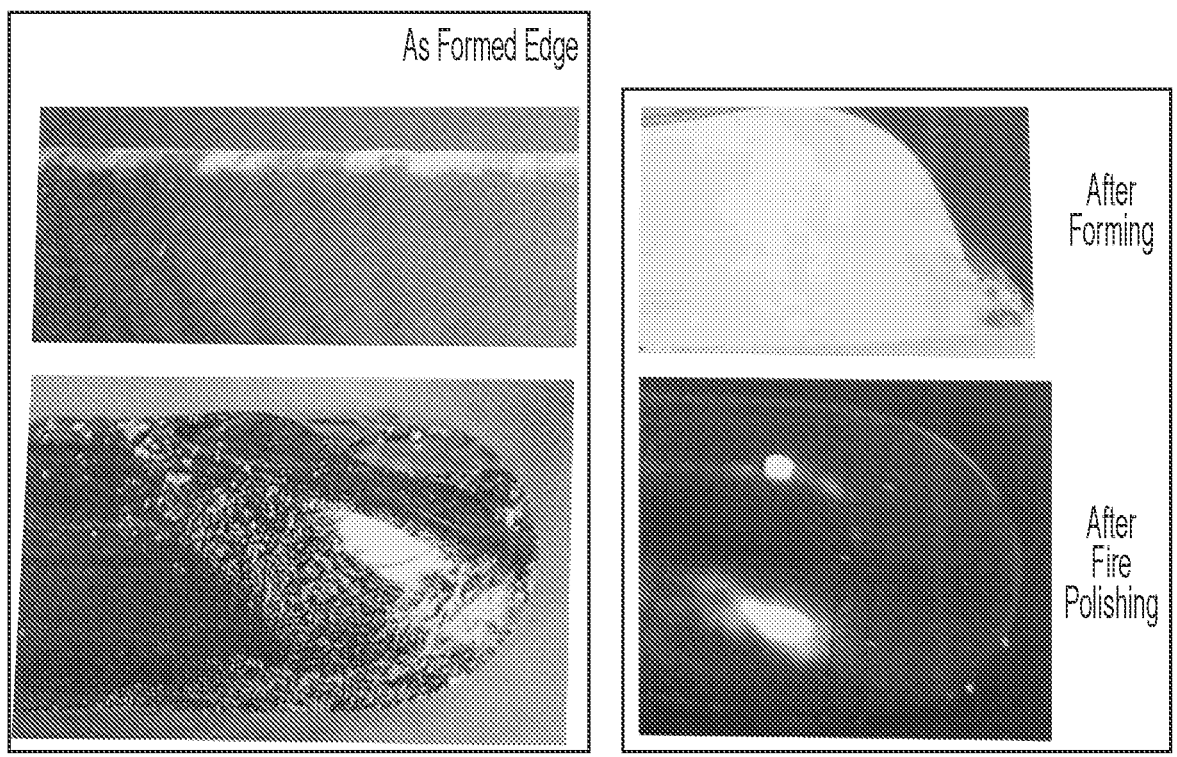

FIG. 21 depicts photos of various aspects of product forms made, in accordance with one or more embodiments of the present disclosure.

DETAILED DESCRIPTION OF THE DRAWINGS

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

FIG. 1A depicts a schematic view of an embodiment of a conveyor system 100 having optional upstream processing components, in order to provide a ribbon material to the conveyor for processing into parts 24, in accordance with one or more embodiments of the present disclosure. The optional glass processing system 40 having a delivery and processing systems including: a molten material delivery apparatus 60, thin ribbon deposition 200, providing a pair of forming rollers 212 and a pair of sizing rollers 218, and air turn 240, which directs the ribbon material to the downstream conveyor system 100.

The optional thin ribbon deposition apparatus 200 includes a pair of forming rollers 212, including a first forming roller and a second forming roller. The forming rollers 212 are configured to direct a continuously delivered batch of molten material (e.g. glass, ceramic, and/or glass ceramic) into a hot, flexible ribbon (i.e. where the ribbon has a taffy-like, hot flexible but higher retention in shape/higher viscosity than the molten material). The ribbon material is configured with two major surfaces, a first and second surface, and two corresponding edges, a first edge and second edge. Next, the ribbon is directed through a pair of sizing rollers 218, including a first sizing roller and a second sizing roller. The sizing roller are configured to actuate on the glass ribbon surfaces (first major surface, second major surface, and first and second edges) to configure the glass in a uniform thickness (e.g. as measured across its length and width).

As shown in FIG. 1A, after the optional upstream processing forms the ribbon material, the ribbon material is directed onto a conveyor system 100. The conveyor system 100 is configured with a plurality of mold assemblies 110, sized to accept the glass ribbon. The mold assemblies 110 are configured in a spaced, sequential order, such that a mold assembly 110 is adjacent to at least two other mold assemblies 110.

The conveyed mold assemblies 110 are configured in a substantially horizontal direction, such that gravity assists in the ribbon material ribbon laying atop the mold assemblies 110. The conveyor system 100 is configured with a conveyor roller assembly 140, which includes a conveyor pressure roller 144. The conveyor pressure roller 144 is a pinch roller 146 having a pinch edge 148 thereon, which actuates against a first surface (an upper surface) of the ribbon material, pressing the ribbon material in a flattened configuration against the mold assembly 110 and corresponding mold surface 120. The glass ribbon is thereby molded via the actuation between the mold surface and the conveyor pressure roller surface to define a plurality of molded glass ribbon portions also having at least one pinch region.

As the molded glass ribbon portions continue to travel along the conveyor 100, the glass continues to cool. The reduced temperature is sufficient to initiate a break of the glass along the thin pinch line/region, such that the molded glass ribbon separates into a plurality of molded glass components as the conveyor directs the molded glass components towards an exit of the conveyor 100. Optionally, a part removal module 160 is configured towards the exit of the conveyor such that the positive pressure actuator 162 is configured to blow air from the conveyor to facilitate lifting the plurality of molded glass parts from the conveyor and/or separating two or more molded glass parts from each other along the thin pinch line(s).

FIG. 1B includes a different embodiment of the conveyor system 100, in which each mold surface 112 is configured with a pinch edge such that when the glass ribbon is actuated between a pressure roller 144 of the conveyor roller assembly 140 and mold surface 120 having a pinch edge, the ribbon material is impacted by the pinch edge in the lower surface, thus imparting at least one pinch line/pinch region into the ribbon material.

As the molded ribbon material continues to travel along the conveyor 100, the material continues to cool. The reduced temperature is sufficient to initiate a break of the molded and pinched ribbon material along the thin pinch line or region, such that the molded glass ribbon separates into a plurality of surfaced patterned molded parts. Optionally, a part removal module 160 is configured towards the exit of the conveyor 100 such that a positive pressure actuator 162 blows air from the conveyor to facilitate lifting the plurality of surface pattered molded glass parts from the conveyor and/or separating two or more surface patterned molded glass parts from each other along the thin pinch line(s).

FIG. 2 includes a different embodiment of the conveyor system 100, in which each mold surface 120 is configured with a three-dimensional surface pattern to impact such three-dimensional surface pattern onto the lower surface of the ribbon material when the pressure roller 144 actuates on the first surface of the ribbon material. Here, a thin pinch may be imparted onto the first surface by incorporating a pinch edge 148 on the roller 144 to make it a pinch roller 146. Alternatively, to impart a pinch region, the mold assembly 110 may have a trim edge 116 defined adjacent to the part edge or the mold assembly may have a trim edge configured in the mold carrier 114, configured between edges of each mold assembly 110.

As the molded ribbon material continues to travel along the conveyor 100, the material continues to cool. The reduced temperature is sufficient to initiate a break of the molded and pinched ribbon material along the thin pinch line or region, such that the molded glass ribbon separates into a plurality of surfaced patterned molded parts. Optionally, a part removal module 160 is configured towards the exit of the conveyor 100 such that a positive pressure actuator 162 blows air from the conveyor to facilitate lifting the plurality of surface pattered molded glass parts from the conveyor and/or separating two or more surface patterned molded glass parts from each other along the thin pinch line(s).

FIG. 3 includes a different embodiment of the conveyor system 100, in which each mold surface 102 is configured with a smooth pattern and the pressure roller 144 is configured with a three-dimensional surface pattern to impact such three dimensional surface pattern onto the upper (first surface) surface of the ribbon material when the pressure roller 144 actuates on the first surface of the ribbon material. Here, a thin pinch may be imparted onto the first surface by incorporating a pinch edge 148 on the roller 144 to make it a pinch roller 146. Alternatively, to impart a pinch region, the mold assembly 110 may have a trim edge 116 defined adjacent to the part edge or the mold assembly may have a trim edge configured in the mold carrier 114, configured between edges of each mold assembly 110.

As the molded ribbon material continues to travel along the conveyor 108, the material continues to cool. The reduced temperature is sufficient to initiate a break of the molded and pinched ribbon material along the thin pinch line or region, such that the molded glass ribbon separates into a plurality of surfaced patterned molded parts. Optionally, a part removal module 160 is configured towards the exit of the conveyor 108 such that a positive pressure actuator 162 blows air from the conveyor to facilitate lifting the plurality of surface pattered molded glass parts from the conveyor and/or separating two or more surface patterned molded glass parts from each other along the thin pinch line(s).

FIG. 4 includes a different embodiment of the conveyor system 100, in which each mold surface 112 is configured with a three-dimensional surface pattern and the pressure roller 144 is configured with a three-dimensional surface pattern. In this embodiment, the mold surface 112 imparts a three-dimensional surface pattern to the lower surface of the glass ribbon, and the roller 144 imparts a three-dimensional surface pattern to the upper surface (first surface) of the pressure layer. The first surface and second surface may be configured with the same pattern. The first surface and second surface may have different surface patterns. Here, a thin pinch may be imparted onto the first surface by incorporating a pinch edge 148 on the roller 144 to make it a pinch roller 146. Alternatively, to impart a pinch region, the mold assembly 110 may have a trim edge 116 defined adjacent to the part edge or the mold assembly may have a trim edge configured in the mold carrier 114, configured between edges of each mold assembly 110.

As the molded ribbon material continues to travel along the conveyor 100, the material continues to cool. The reduced temperature is sufficient to initiate a break of the molded and pinched ribbon material along the thin pinch line or region, such that the molded glass ribbon separates into a plurality of surfaced patterned molded parts. Optionally, a part removal module 160 is configured towards the exit of the conveyor 100 such that a positive pressure actuator 162 blows air from the conveyor to facilitate lifting the plurality of surface pattered molded glass parts from the conveyor and/or separating two or more surface patterned molded glass parts from each other along the thin pinch line(s).

FIG. 5 includes a different embodiment of the conveyor system 100, in which each mold surface 120 is configured with a three-dimensional surface pattern and vacuum engagement portions 132 that extend through the mold body 120 and connect to a vacuum box 136. In this embodiment, the vacuum box 134 actuates, and pulls air from the cavity between the ribbon material and upper surface of the mold body 120, removing air from the cavity and thereby deforming the ribbon material to the surface of the mold. Thus, the ribbon material is configured, via vacuum, with the three-dimensional surface.

In one embodiment, the pressure roller actuates with the first surface of the ribbon material to press at least a portion of the ribbon material onto the surface of the mold (e.g. imparting a pattern onto the lower surface of the ribbon at portions where there is contact, or providing a pinch edge around the three-dimensional part shape (trim/pinch edge on mold surface 116) or between mold assemblies (via pinch edge configured on mold carrier 114).

In another embodiment, a pinch region may be imparted onto the first surface by incorporating a pinch edge 148 on the roller 144 to make it a pinch roller 146. Alternatively, to impart a pinch region, the mold assembly 110 may have a trim edge 116 defined adjacent to the part edge or the mold assembly may have a trim edge configured in the mold carrier 114, configured between edges of each mold assembly 110. In various embodiments, the pressure roller can be configured to actuate the ribbon material onto the mold before, during, or after the vacuum actuation step.

As the molded ribbon material continues to travel along the conveyor 100, the material continues to cool. The reduced temperature is sufficient to initiate a break of the molded and pinched ribbon material along the thin pinch line or region, such that the molded glass ribbon separates into a plurality of surfaced patterned molded parts. Optionally, a part removal module 160 is configured towards the exit of the conveyor 100 such that a positive pressure actuator 162 blows air from the conveyor to facilitate lifting the plurality of surface pattered molded glass parts from the conveyor and/or separating two or more surface patterned molded glass parts from each other along the thin pinch line(s).

The plurality of pinches in the ribbon material can be configured in various directions, based on the corresponding patterning of the thin pinch rollers 224.

In one embodiment, the plurality of thin pinches comprise a plurality of transverse pinches, where each transverse pinch is configured to extend from one edge to the other edge (e.g. across the width of the ribbon material). The forming system is configured with a thin pinch component and conveyor 100.

In one embodiment, the plurality of thin pinches comprise a plurality of axial pinches, where each axial pinch is configured to extend in parallel with the direction that ribbon is conveyed (e.g. along at least a portion of the length of the ribbon). In one embodiment, the plurality of pinches are configured in an arcuate direction (e.g. angled across the linear dimension of the ribbon), such that the ribbon comprises a plurality of parallelograms (e.g. opposing parallel edges) configured thin pinch regions.

Figure 6:
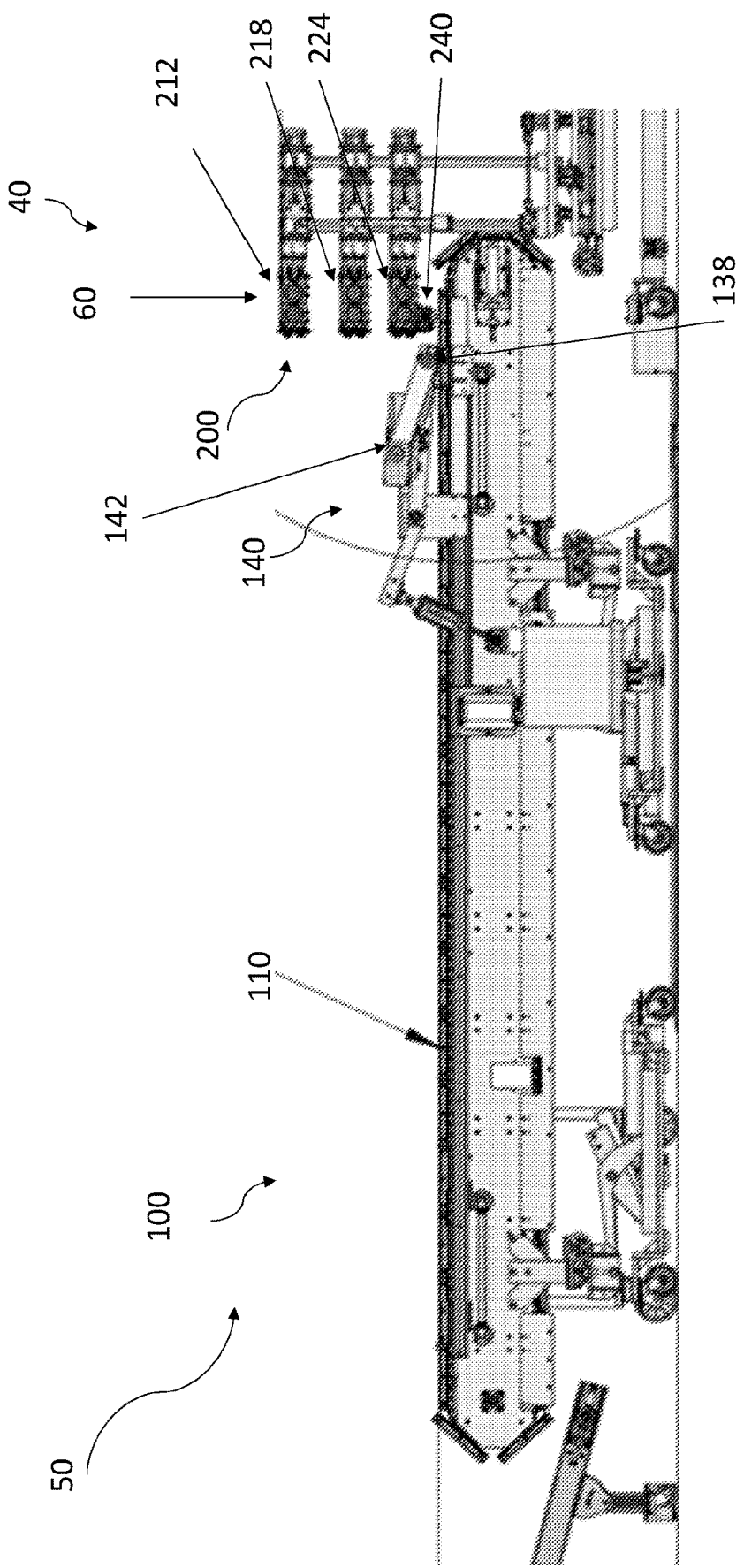
FIG. 6 depicts an aspect of the system in accordance with one or more aspects of the present disclosure.

FIG. 6 depicts an aspect of the glass part processing system 50, in accordance with one or more aspects of the present disclosure. As shown in FIG. 6, a glass delivery system 60, a glass processing system 40, and a glass conveyor system 100 are depicted.

The glass delivery system 60 provides molten material (e.g. glass, ceramic or glass ceramic material) into the glass processing system 40. The glass processing system 40 includes: forming rollers 212 (first forming roller and second forming roller); sizing rollers 218 (first sizing roller and second sizing roller), and pinching rollers 224 (first pinching roller and second pinching roller).

The forming rollers 212 are configured to form a hot flexible ribbon material (e.g. glass ribbon material, ceramic ribbon material, or glass ceramic ribbon material) from the molten material delivered. Once formed, the ribbon material is sized to the appropriate width and thickness (e.g. uniform thickness) via the sizing rollers 218.

Once the ribbon is formed and sized, the pinch rollers 224 are configured to provide a pinch in the ribbon material, thus creating a pinch region in the ribbon material. The pinch region is configured to define the boundary between: the part and cullet, between discrete parts, and/or combinations thereof. The pinch region, together with the glass ribbon of initial cross-sectional thickness is configured to be processed downstream as a unitary piece (e.g. ribbon material+pinch region), continuously directed from glass delivery system 60 to ribbon deposition system 200, including: forming rollers 212, sizing rollers 218 and thin pinch rollers 224. The glass processing system 40, as depicted, illustrates the rollers (roller deposition system 200) configured in a gravity-assisted and/or vertical configuration.

Referring to FIG. 6, the pinched ribbon is directed from the glass processing system 40 into the glass conveyor system 100 via an air turn 240 (e.g. air bend located beneath the pinching rollers 224 and adjacent to the conveyor belt 108 of conveyor 100. The conveyor system 100 includes a conveyor belt 108, a plurality of mold assemblies 110 on the conveyor belt 108, and a pressure arm assembly 140. The pinched ribbon material is directed, via the air turn assembly 240, from a vertical position to a generally horizontal position, and is deposited along the molds (mold surfaces 120 of corresponding mold assemblies 110) on the conveyor 100, where the pinched ribbon material undergoes further processing.

The conveyor roller assembly 140 is configured with at least one roller. The at least one roller is configurable as: a pinch roller 146 (with corresponding pinch edge(s) 148), a pressure roller 144, a pressure roller (e.g. having a smooth surface), a pressure roller having a three-dimensional surface pattern 152 (e.g. micro pattern or macro pattern), and/or combinations thereof.

The conveyor roller assembly 140 is configured with a frame 142 comprising a motor, the roller 138, and accompanying optional hydraulic components (e.g. configured to promote engagement between the roller and the ribbon material). The conveyor 100 is configured with a wheeled frame assembly, which is configured to be adjustable relative to the location of the glass processing system 40. The pressure roller assembly 140 roller engages with a first surface of the ribbon material, such that the pinched ribbon material is engaged between the mold surface 120 and the roller 138. Depending on the configuration of the pressure arm roller 138 and/or mold surface 120 (or mold carrier 114), the pinched ribbon material undergoes further processing as it is transported along the conveyor.

While the ribbon is travelling through the ribbon processing system 40 and conveyor system 100, the ribbon is slowly cooling. Once cooled sufficiently, the compressive stresses created between the pinch region and the adjacent portions (e.g. with a cross-sectional thickness corresponding to the majority of the ribbon material) are high enough to cause the ribbon material to separate along the pinch region. The resulting separation along the pinch region creates discrete parts and/or cullet, depending on the configuration of the pinch region(s) and resulting product shape/dimension.

After forming discrete parts from the thinly pinched glass ribbon, the parts can be vacuum lifted off of the conveyor or removed from the mold(s) as the mold reaches the end of the conveying portion (e.g. e.g. while the molds are still horizontal, prior to being lifted/positioned into a vertical upright position). The parts can undergo further downstream processing. For example, the edges of the part defined by pinch region separation, can undergo fire polishing to smooth the edges. Alternative processing includes: mechanical processing, acid etch, laser processing, and/or combinations thereof.

Figure 7:
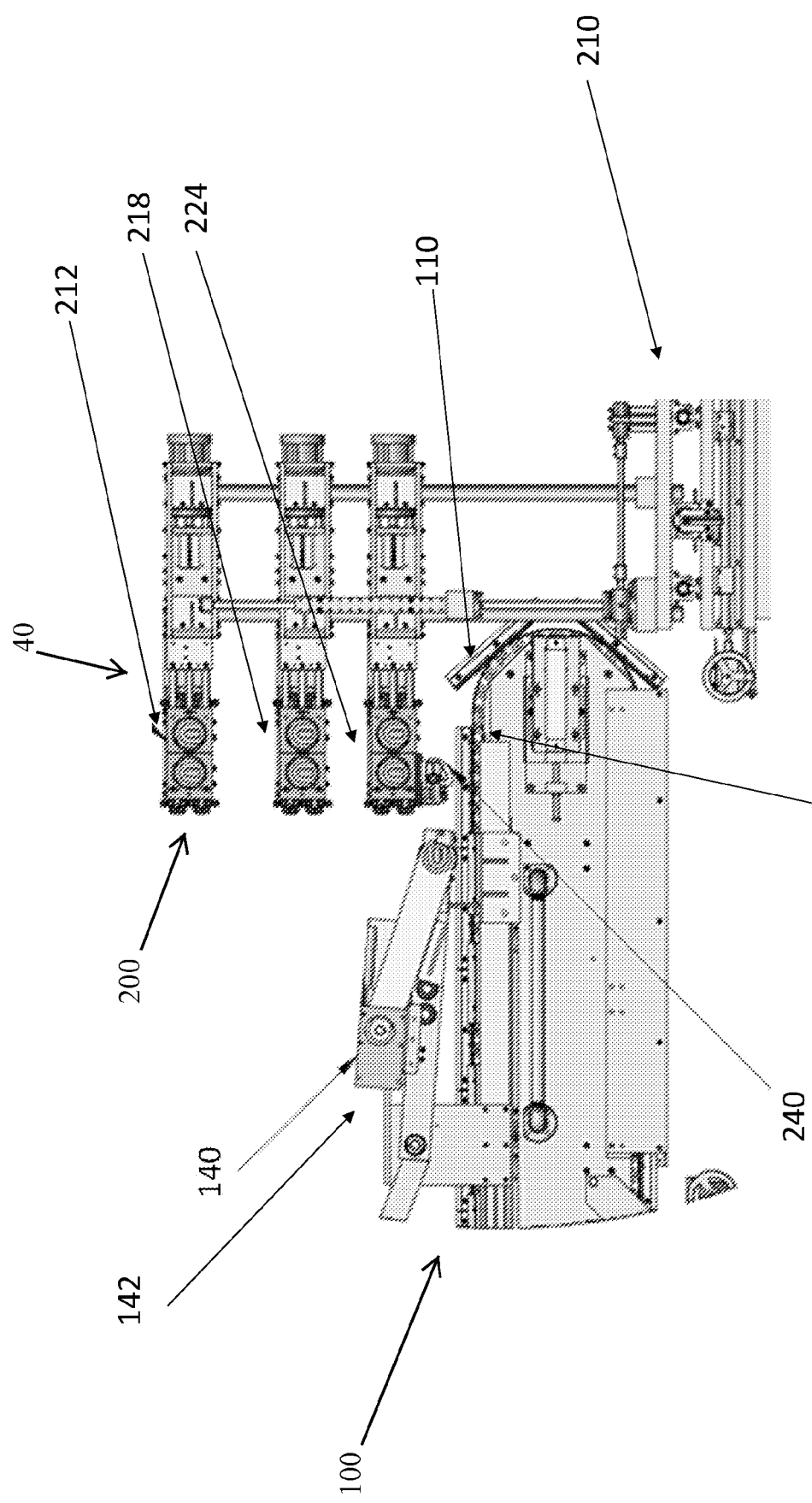
FIG. 7 shows an enlarged view of a portion of the glass processing system and conveyor system of FIG. 6.

FIG. 7 shows an enlarged view of a portion of the glass processing system and conveyor system of FIG. 6. As depicted in FIG. 7, the conveyor 100 is configured such that the conveyor belt 108 with plurality of mold assemblies 110 configured thereon can circulate around an upper (working) surface of the conveyor belt 108, where the glass ribbon is being processed, then after the formed glass parts are removed from the mold surfaces 120 on the conveyor belt 108, the mold assemblies and conveyor belt travel back towards the glass ribbon loading zone, where the thinly pinched glass ribbon is directed back onto empty mold assemblies 110 attached to the conveyor belt 108 via air bend 240. The closer view of the ribbon delivery system 200 illustrates the pair of forming rollers 212 configured adjacent to one another, the pair of sizing rollers 218 positioned adjacent to one another, and the pair of thin pinch rollers 224 positioned adjacent to each other. Further, glass ribbon deposition system 200 is vertically adjustable via its frame 210, thus configuring the distance between the glass ribbon deposition system 200 and the conveyor system 100. Also, the conveyor supports are adjustable vertically as well—also allowing the distance to be adjustable between the ribbon deposition system 200 and the conveyor system 100.

FIG. 8A-8C depicts three different embodiments for a pinch roller 146 having a pinch edge 148, in accordance with one or more aspects of the present disclosure.

In some embodiments, one of the pinch rollers 146 of FIGS. 8A through 8C are configured in the pinch rollers 146 of the glass processing assembly 40.

In some embodiments, one of the pinch roller 146 of FIGS. 8A through 8C are configured in the pressure roller 138 of the conveyor pressure roller 144 within the conveyor system 100.

Referring to FIG. 8A, a pinch roller 146 having a pinch edge 148 configured as a complex-patterned perimeter (e.g. non-circular, atypical, and/or asymmetrical) is depicted, in accordance with one or more embodiments of the present disclosure.

Referring to FIG. 8B, a pinch roller 146 having a pinch edge 148 configured as a circular perimeter is depicted, in accordance with one or more embodiments of the present disclosure.

Referring to FIG. 8C, a pinch roller 146 having a pinch edge 148 configured as a double-Y is depicted, in accordance with one or more aspects of the present disclosure. As a non-limiting example, when utilized on the ribbon material, the double Y is configured to define a border between two discrete parts, while providing a collared-edge (e.g. corner cuts) along the corners of the final part.

FIG. 9A depicts a schematic view of the pinch rollers 224, 226 of the glass processing system 40, in accordance with one or more embodiments of the present disclosure.

As depicted in FIG. 9A, one of the two rollers, the first roller 224 is configured with a pinch edge 230, such that when the ribbon material travels between the pinch rollers (224 and 226), a pinch region is defined in/pressed into the ribbon material.

FIG. 9B depicts a schematic view of the pinch rollers (224, 226) of the glass processing system 40, in accordance with one or more embodiments of the present disclosure.

As depicted in FIG. 9B, each of the rollers (first pinch roller 224, second pinch roller 226) is configured with a pinch edge (first pinch roller 224 configured with pinch edge 230, second pinch roller 226 configured with pinch edge 232. In this configuration, the pinch edges (230, 232) are configured to correspond to each other's respective positions, such that when the ribbon material travels between the pinch rollers (224, 226), a pinch region is defined in the ribbon material as the two pinch edges (230, 232) matingly engage in a corresponding proximal position. As such, the glass ribbon is imparted with a thin pinch actuated into its first major surface and opposing location in its second major surface.

FIG. 10A is a schematic top plan view of an embodiment of a ribbon material 10, in accordance with various aspects of the present disclosure. The ribbon material 10 is configured as a continuous body and/or long member (e.g. depending on glass delivery mode, continuous or batch). The glass ribbon 10 is configured with a first major surface 16 and a second major surface 18, and corresponding first edge 12 and second edge 14. When the glass is configured via the forming and sizing rollers, the rollers communicate with the first and second major surfaces of the ribbon, in order to configure the ribbon into a ribbon having a corresponding thickness (e.g. based on roller spacing/gap).

FIG. 10B is a schematic side plan view of the ribbon material 10, in accordance with one or more aspects of the present disclosure. As disclosed in one or more embodiments herein, the conveyor is configured to retain (via its plurality of mold assemblies) the glass ribbon 10 such that the second surface is in contact with the mold assemblies. In this position, the first surface 16 is facing towards the pressure roller (e.g. roller configured to contact/communicate with the first surface of the ribbon material). The second major surface 18 is facing towards the mold surface of the mold assembly. FIG. 10B also depicts the cross-sectional thickness 38 of the ribbon material 10.

FIG. 11A is a schematic plan side view of an embodiment of a ribbon material 10 positioned in the conveyor system 100, in accordance with various aspects of the present disclosure. As depicted in FIG. 11A, the ribbon material 10 is configured as a continuous body and/or long member (e.g. depending on glass delivery mode). The conveyor 100 generically depicts the plurality of mold assemblies 110 configured in sequent. The mold assemblies 110 of the conveyor 100 are configured to the glass ribbon 10 such that the second surface 18 is in contact with the mold assembly 110. In this position, the first surface 16 is facing in an upwards direction, towards the conveyor roller assembly 140 and corresponding roller configured therein. The roller is depicted as a pinch roller arm 146 having a defined pinch edge 148 configured to contact the glass ribbon 10 at its first surface 16, actuating a pinch region in ribbon 10 via the pinch edge 148 in the pinch roller 146.

FIG. 11B is a schematic plan side view of an embodiment of a ribbon material 10 positioned in the conveyor system 100 where the mold assemblies 110 are each configured with a corresponding pinch edge 116, in accordance with various aspects of the present disclosure. As depicted in FIG. 11B, the ribbon material 10 is configured as a continuous body and/or long member (e.g. depending on glass delivery mode). The conveyor 100 is configured to retain (via its plurality of mold assemblies 110) the glass ribbon 10 such that the second surface 18 is in contact with the mold assemblies. In this position, the first surface 16 is facing towards the roller configured as a pinch roller 146 with pinch edge 148. The pinch roller 146 actuates on the first surface 16 of the ribbon 10, thereby pressing the ribbon 10 onto the pinch edge 116 of each corresponding mold assembly. Also, as the pinch roller 146 actuates on the first surface of the ribbon 10, the pinch edge 148 of the pinch roller 146 actuates a thin pinch on the first surface 16 of the ribbon 10. As the pinch roller 146 cooperates with the pinch edges 116 of the mold assemblies 110, the corresponding pinched ribbon is configured with a pinch region having a thin pinch 20 in the first surface positioned in cooperation with a thin pinch in the second surface 18 (depicted as area surrounding pinch edge 116 of mold assembly after the roller actuates.

FIG. 12A-12E depict various configurations of a roller, utilizable in the pinch roller of the glass processing system 40 and/or as shown here with reference numbers, in the pressure roller configured as a pinch roller 146 with pinch edge 148 of the conveyor system 100, in accordance with one or more aspects of the present disclosure.

As depicted in FIG. 12A, the pinch roller 146 is configured with two corresponding pinch edges 148 that run circumferentially around the roller 146, such that the pinch edges 148 define a pinch region adjacent to each of the first and second edges along the edges of the ribbon material. In one embodiment, as the processed ribbon material is cooled, the pinch region separates the product from the edges/cullet. Alternatively, as another embodiment, circumferential pinch edges are utilized to define rows of discrete parts formed from the ribbon material. The pinch edge 148 depicted in FIG. 12A is configured to provide axial thin pinch region(s) in the corresponding ribbon material, along the length of the ribbon.

As depicted in FIG. 12B, the pinch roller 146 is configured with a pinch edge 148 that extends from one end of the roller 146 to the other end of the roller, in an axial direction on the roller 146. In one embodiment, as the processed ribbon material is cooled, the pinch region separates the product from the edges/cullet. Alternatively, as another embodiment, axial pinch edges are utilized to define rows of discrete parts formed from the ribbon material. The pinch edge 148 depicted in FIG. 12B is configured to provide a transverse thin pinch region(s) in the corresponding ribbon material, extending from one edge of the ribbon to towards the other edge of the ribbon, along the width of the ribbon.

As depicted in FIG. 12C, the pinch roller 146 is configured with a pinch edge 148 that extends from one end of the roller to the other end of the roller in an axial direction. Additionally, the roller surface is configured with patterned, three dimensional surface pattern 152 configured as a three-dimensional micropattern 158 along the roller surface, which imparts the corresponding three-dimensional micropattern onto the surface of the ribbon material (e.g. in the negative or mirror image). In one embodiment, as the processed, surface-patterned ribbon material is cooled, the pinch region separates the product from the edges/cullet. Alternatively, as another embodiment, pinch edges are utilized to define rows of discrete parts formed from the ribbon material.

As depicted in FIG. 12D, the pinch roller 146 is configured with a pinch edge that extends from one end of the pinch roller 146 to the other end of the pinch roller 146 in an axial direction. Additionally, the roller surface is configured with a three-dimensional surface pattern 152 configured as a macro pattern 156 (e.g. star-shapes) along the its surface, which imparts the corresponding three-dimensional macropattern onto the surface of the ribbon material (e.g. in the negative or mirror image). In one embodiment, as the processed, surface-patterned ribbon material is cooled, the pinch region separates the product from the edges/cullet. Alternatively, as another embodiment, pinch edges are utilized to define rows of discrete parts formed from the ribbon material.

As depicted in FIG. 12E, the pinch roller 146 is configured with a plurality of pinch edges 148, including at least two corresponding types of pinch edges 148: circumferential pinch edges (e.g. positioned around the roller) and axial pinch edges (e.g. positioned to extend from one end of the roller to the other). Thus, the ribbon material is imparted with a plurality of pinch regions in a grid-type pattern. As the processed ribbon material is cooled, the pinch regions separate the product(s) from the edges/cullet portions. Alternatively, as another embodiment, circumferential pinch edges are utilized to define rows of discrete parts formed from the ribbon material.

FIG. 13 depicts a schematic cut-away side view of the conveyor assembly 100, which shows the vacuum engaging portion 132, vacuum boxes 136 configured below the mold assemblies 110, and part removal module 160, depicted as positive pressure actuators 162 configured with a plurality of push-up members (e.g. air pressure tubes) to facilitate removal of the formed glass parts at the end of the conveyor assembly 100, in accordance with one or more embodiments of the present disclosure. The conveyor 100 is equipped with a plurality of vacuum boxes 136, where each vacuum box 136 is configured to interact with a plurality of mold assemblies 110. In operation, a vacuum is applied via the vacuum engaging portion 132 (which is in communication with the vacuum box 136), thereby pulling a vacuum/negative pressure across the mold surface, through the vacuum engaging portions 132, through the vacuum box 136 and out through the vacuum ports which exit the conveyor system 100. Accordingly, the ribbon member is pulled towards and/or deformed/formed onto the mold surface via the negative pressure imparted between the lower surface of the glass ribbon and the mold surface via the vacuum engaging portions 132. The resulting ribbon material is configured into a three-dimensional shape which corresponds to the three-dimensional shape from the three-dimensional mold surface of each corresponding mold assembly 110. Also, as shown in FIG. 13, the push up mechanism 160 (part removal module) is equipped with individual, positively pressured ports (shown as 162, positive pressure actuator), which actuate to push up on the holes in the mold and push out the vacuum molded three-dimensional parts.

FIG. 14 is a perspective top view of an embodiment of a conveyor assembly 100, where the plurality of mold assemblies 110 are configured with flat surfaces, in accordance with one or more aspects of the present disclosure. FIG. 14 also depicts some additional components of the conveyor roller assembly 140 configured with the pressure roller 144 and frame 142.

FIG. 15 is a perspective top view of an embodiment of a conveyor assembly 100 having a plurality of mold assemblies 110 with three-dimensional complex shapes and corresponding vacuum forming configuration (depicted via vacuum port 134), in accordance with one or more aspects of the present disclosure. The mold assemblies 110 are configured with a mold body 112 (defining the resulting shape and/or surface pattern imparted on the lower surface of the glass ribbon) and the mold carrier 114 (the component configured to retain the mold body 110 to the conveyor belt 108, so that the mold assemblies 110 are configured in sequential, spaced relation and removably fixed position. Also depicted in FIG. 15, the conveyor roller assembly 140 is depicted, having pressure roller 144 and frame 142.

FIG. 16A is a close-up perspective top view of the mold assembly 110 utilized in the conveyor system 100 of FIG. 14, depicting a mold surface 120 configured as a smooth, flat surfaced-mold, in accordance with one or more embodiments of the present disclosure.

FIG. 16B is a close-up perspective top view of the mold assembly 110 utilized in the conveyor system 100 of FIG. 15, depicting a mold surface 120 configured as a three-dimensional shaped surfaced-mold, in accordance with one or more embodiments of the present disclosure. As depicted, there are a plurality of vacuum engaging portions 132 (through holes) configured in the bottom of the mold assembly 110. The vacuum engaging portions 132 are configured through the mold body 112, such that the holes are configured to pull a vacuum through the vacuum engaging portions 132 when actuated via the vacuum and vacuum box 136. Additionally, the vacuum engaging portions 132 in the mold body 112 are configured to engage with the part removal module at the end of the conveyor belt, such that the positive pressure actuator can push air/positive pressure through the vacuum engaging portions 132 to direct the glass parts away from the mold surface 120. FIG. 16B also depicts a closer view of the mold carrier 114, which is configured to retain the mold body 112 to the conveyor belt; and the mold carrier pinch edge, which is configured to cooperate with the roller in the conveyor roller assembly to actuate a pinch region on the bottom surface of the glass ribbon.

FIG. 16C is a close-up perspective top view of the mold assembly 110 utilized in the conveyor system, depicting a three-dimensional shaped surfaced-mold (e.g. dish or bowl pattern), in accordance with one or more embodiments of the present disclosure. As depicted, there are a plurality of vacuum engaging portions 132 (through holes) configured in the bottom of the mold body 112. The vacuum engaging portions/holes 132 are configured through the mold body 112, such that the holes are configured to pull a vacuum through the holes 132 when actuated via the vacuum and vacuum box, in accordance with various aspects of the present disclosure. Also, the mold assembly 110 is equipped with a mold carrier 114 configured to attach the mold body 112 to the conveyor belt. The mold body is further configured with a pinch edge 116 around the perimeter of the three-dimensional shape in the mold body 112, such that when the pressure roller is engaged over the mold surface 120, the pressure roller engages with the pinch edge 116 and defines a pinch region around the three-dimensional shaped part (e.g. while the vacuum is pulling/forming the ribbon material into the three-dimensional mold shape, in accordance with one or more aspect of the present disclosure.

FIG. 17 is a perspective top view of an embodiment of a conveyor assembly 100 having a plurality of mold assemblies 110 with three-dimensional complex shapes and corresponding vacuum forming configuration, in combination with a pinch edge in the mold assembly (e.g. to define a pinch region around the three-dimensional part 4 formed via vacuum), in accordance with one or more aspects of the present disclosure. Referring to FIG. 17, the glass delivery module 60 directs a molten charge of material (e.g. glass, ceramic, or glass ceramic) into a ribbon deposition system having a pair of forming rollers 212, a pair of sizing rollers, and an air turn 240, to direct the ribbon material onto a conveyor apparatus 100. The conveyor apparatus 100 further includes a plurality of mold assemblies 110 having a mold body and a mold carrier 116, where the mold carrier 116 is configured to attach the mold assemblies to the conveyor belt 108. The conveyor roller assembly provides a trimming roller 146 configured with a trim edge 148. As the trim edge 148 actuates with the ribbon material, the roller 146 also actuates with a trim edge 116 on the corresponding mold surface to provide a trim edge on the first surface and a trim edge on the second surface of the glass ribbon. Also, the vacuum engaging portions 132 provide a negative pressure between the lower surface of the ribbon material and the mold surface, forming the ribbon to the shape of the mold body.

FIG. 18A-E depict various embodiments of complex three-dimensional parts that are manufacturable from ribbon material with one or more aspects of the present disclosure.

FIG. 18A depicts a plan top view (upper FIG. 18A) and plan side view (lower FIG. 18A), depicting an embodiment of a product 24 formed from a vacuum mold assembly having a three-dimensional shape therein, in combination with the conveyor system, in accordance with one or more aspects of the present disclosure. FIG. 18A depicts a product 24 configured as an eating utensil (e.g. soup spoon).

FIG. 18B depicts a plan top view of an embodiment of a product 24 formed from a vacuum mold assembly having a three-dimensional shape therein, in combination with the conveyor system, in accordance with one or more aspects of the present disclosure. FIG. 18B depicts a product 24 configured as round plate with non-uniform edge (e.g. scalloped edge).

FIG. 18C depicts a plan top view of an embodiment of a product 24 formed from a vacuum mold assembly having a three-dimensional shape therein, in combination with the conveyor system, in accordance with one or more aspects of the present disclosure. FIG. 18C depicts a product 24 configured as symmetrical, non-round plate with non-uniform edge (e.g. corresponding perimetrical edge).

FIG. 18D depicts a plan top view of an embodiment of a product 24 formed from a vacuum mold assembly having a three-dimensional shape therein, in combination with the conveyor system, in accordance with one or more aspects of the present disclosure. FIG. 18D depicts a product 24 configured as symmetrical, geometric (rectangular) plate with non-uniform edge (e.g. corresponding perimetrical edge).

FIG. 18E depicts a plan top view of an embodiment of a product 24 formed from a vacuum mold assembly having a three-dimensional shape therein, in combination with the conveyor system, in accordance with one or more aspects of the present disclosure. FIG. 18E depicts a product 24 configured as symmetrical, geometric (oval) with a raised edge/wall having a non-uniform height (scalloped or ridged wall).

FIG. 19 depicts a schematic, perspective top view of an embodiment of the conveyor system 100 in accordance with one or more aspects of the present disclosure. As shown in FIG. 19, the complex shape conveyor is configured to provide a vacuum formed, three-dimensional shape with corresponding three-dimensionally shaped mold assembly 110. The resulting product 24 can be utilized as a glass, ceramic, or glass ceramic roof tile. The resulting product can be utilized as a glass, ceramic, or glass ceramic roof tile, in accordance with one or more embodiments of the present disclosure. As shown in FIG. 19, the conveyor belt 108 has a plurality of mold assemblies 110 configured thereon, with a pinch region 20 defined between each adjacent mold assembly, configured to define a pinch region in the glass ribbon at its lower surface. The mold assembly 110 is configured as a female mold with an indented mold surface pattern.

FIG. 20 depicts a schematic, perspective top view of an embodiment of the conveyor system 100 in accordance with one or more aspects of the present disclosure. As shown in FIG. 20, the complex shape is configured as a male mold (configured as a raised pattern) in the mold assembly 110 and the ribbon material is rolled with a pressure roller having a corresponding surface profile to conform the ribbon material to the mold surface 120 (e.g. without vacuum forming). The three-dimensionally shaped product 24 is shown with corresponding three-dimensionally shaped mold assemblies. The resulting product can be utilized as a glass, ceramic, or glass ceramic roof tile, in accordance with one or more embodiments of the present disclosure.

FIG. 21 depicts photos of various aspects of product forms made, in accordance with one or more embodiments of the present disclosure. At the top left, an embodiment of the as-formed edge is shown, in accordance with one or more embodiments of the present disclosure. At the top right, an embodiment of the separated region along the pinch edge is depicted. At the lower left, the as-formed edge is shown at a different angle from the upper left, in accordance with one or more embodiments of the present disclosure. At the lower right, the pinch edge/part edge is shown after post-processing (fire polishing), in accordance with various aspects of the present disclosure.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A method, comprising:
    depositing a hot flexible glass-containing ribbon along a plurality of sequentially conveyed molds;
    rolling a pressure roller over a surface of the glass-containing ribbon, such that at least one pinch region is actuated in the glass-containing ribbon as the glass-containing ribbon is pinched between a protruding pinch edge of the pressure roller and a surface of the mold, wherein the at least one pinch region has a cross-sectional thickness that is not greater than 75% of a cross-sectional thickness of the glass-containing ribbon;
    cooling the glass-containing ribbon; and
    separating the glass-containing ribbon along the at least one pinch region into discrete glass parts.

2. The method of claim 1, further wherein a perimetrical edge of each of the discrete glass parts is defined by the at least one pinch region.

3. The method of claim 2, further wherein the at least one pinch region is at least one of the edges of the glass-containing ribbon.

4. The method of claim 1, wherein the rolling of the pressure roller over the surface of the glass-containing ribbon is performed such that the pressure roller is actuated in the glass-containing ribbon as the glass-containing ribbon is pressed between a first three-dimensional surface pattern of the mold comprising a cavity and the pressure roller, and wherein the cooling of the glass-containing ribbon forms a three-dimensional patterned surface glass-containing ribbon, wherein each mold is configured with a first three-dimensional surface pattern.

5. The method of claim 4, wherein the pressure roller has a surface defined with a second three-dimensional pattern.

6. The method of claim 1, wherein each mold comprises a three-dimensional part shape in the surface of each mold with vacuum engaging portions, wherein the method further comprises negatively pressurizing a cavity defined between the glass-containing ribbon and the mold surface via the vacuum engaging portions, thereby forming the glass-containing ribbon to the surface of the three-dimensional part shape, wherein the rolling of the pressure roller over the surface of the glass-containing ribbon is performed such that the pressure roller engages the glass-containing ribbon towards the mold, and wherein the cooling of the glass-containing ribbon forms a three-dimensional glass part.

* * * * *